US012568509B2

(12) United States Patent
Lee et al.

(10) Patent No.: US 12,568,509 B2
(45) Date of Patent: Mar. 3, 2026

(54) METHOD AND APPARATUS FOR DATA TRANSMISSION AND RECEPTION

(71) Applicant: LG Electronics Inc., Seoul (KR)

(72) Inventors: Jongku Lee, Seoul (KR); Kijun Kim, Seoul (KR); Dongsun Lee, Seoul (KR); Byounggill Kim, Seoul (KR); Hyunmin Kim, Seoul (KR); Taehowan Hong, Seoul (KR); Seju Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/918,484

(22) PCT Filed: Apr. 22, 2022

(86) PCT No.: PCT/KR2022/005762
§ 371 (c)(1),
(2) Date: Oct. 12, 2022

(87) PCT Pub. No.: WO2023/204327
PCT Pub. Date: Oct. 26, 2023

(65) Prior Publication Data
US 2024/0224289 A1      Jul. 4, 2024

(51) Int. Cl.
H04W 72/23 (2023.01)
H04W 72/232 (2023.01)
H04W 72/543 (2023.01)

(52) U.S. Cl.
CPC ....... H04W 72/232 (2023.01); H04W 72/543 (2023.01)

(58) Field of Classification Search
None
See application file for complete search history.

(56) References Cited

U.S. PATENT DOCUMENTS 11,258,532 B2 * 2/2022 Park ................. H04W 72/0446
2019/0215095 A1 * 7/2019 Park ................. H04W 72/0453
(Continued)

FOREIGN PATENT DOCUMENTS

| KR | 10-2021-0139153 | 11/2021 |
| WO | WO 2020/138980 | 7/2020 |
| WO | WO 2022/029317 | 2/2022 |

OTHER PUBLICATIONS

Huawei et al., "Multi-subframe scheduling design for eLAA," R1-164075, 3GPP TSG RAN WG1 Meeting #85, Nanjing, China, May 23-27, 2016, 7 pages.
(Continued)

*Primary Examiner* — Khaled M Kassim
*Assistant Examiner* — Ahmed Saifuddin
(74) *Attorney, Agent, or Firm* — Fish & Richardson P.C.

(57) ABSTRACT

Provided are a method and an apparatus for transmitting data in a wireless communication system. Logical channels or data streams are divided into two groups according to QoS characteristics and sorted in ascending order of the target MCS. The logical channels or data streams arranged in ascending order of the target MCS are transmitted through a plurality of shared channels scheduled by one DCI. The MCSs of the two groups are one of a first type MCS index indicating both modulation order information and code rate information and a second type MCS index indicating modulation order information, and are limited to the same type of MCS indexes.

20 Claims, 17 Drawing Sheets

(56)　　　　　　　References Cited

U.S. PATENT DOCUMENTS

| | | | |
|---|---|---|---|
| 2021/0144743 A1* | 5/2021 | Rastegardoost ...... | H04W 72/23 |
| 2021/0243784 A1* | 8/2021 | Goto ..................... | H04W 72/21 |
| 2021/0368517 A1 | 11/2021 | Chen et al. | |
| 2022/0150027 A1* | 5/2022 | Sun ....................... | H04L 1/1861 |
| 2023/0189390 A1* | 6/2023 | Park ..................... | H04W 76/28 |
| | | | 370/252 |
| 2023/0209530 A1* | 6/2023 | Rastegardoost ...... | H04L 1/1854 |
| | | | 370/329 |
| 2023/0275683 A1* | 8/2023 | Ersbo ................... | H04L 1/0003 |
| | | | 370/329 |
| 2024/0040587 A1* | 2/2024 | Rastegardoost .... | H04W 72/232 |
| 2024/0224289 A1* | 7/2024 | Lee ..................... | H04W 72/232 |
| 2024/0323994 A1* | 9/2024 | Laddu .................. | H04L 1/0009 |
| 2024/0365346 A1* | 10/2024 | Hong ................... | H04L 1/1812 |

OTHER PUBLICATIONS

International Search Report in International Appln. No. PCT/KR2022/005762, mailed on Jan. 18, 2023, 7 pages (with English translation).

\* cited by examiner

Figure 2:
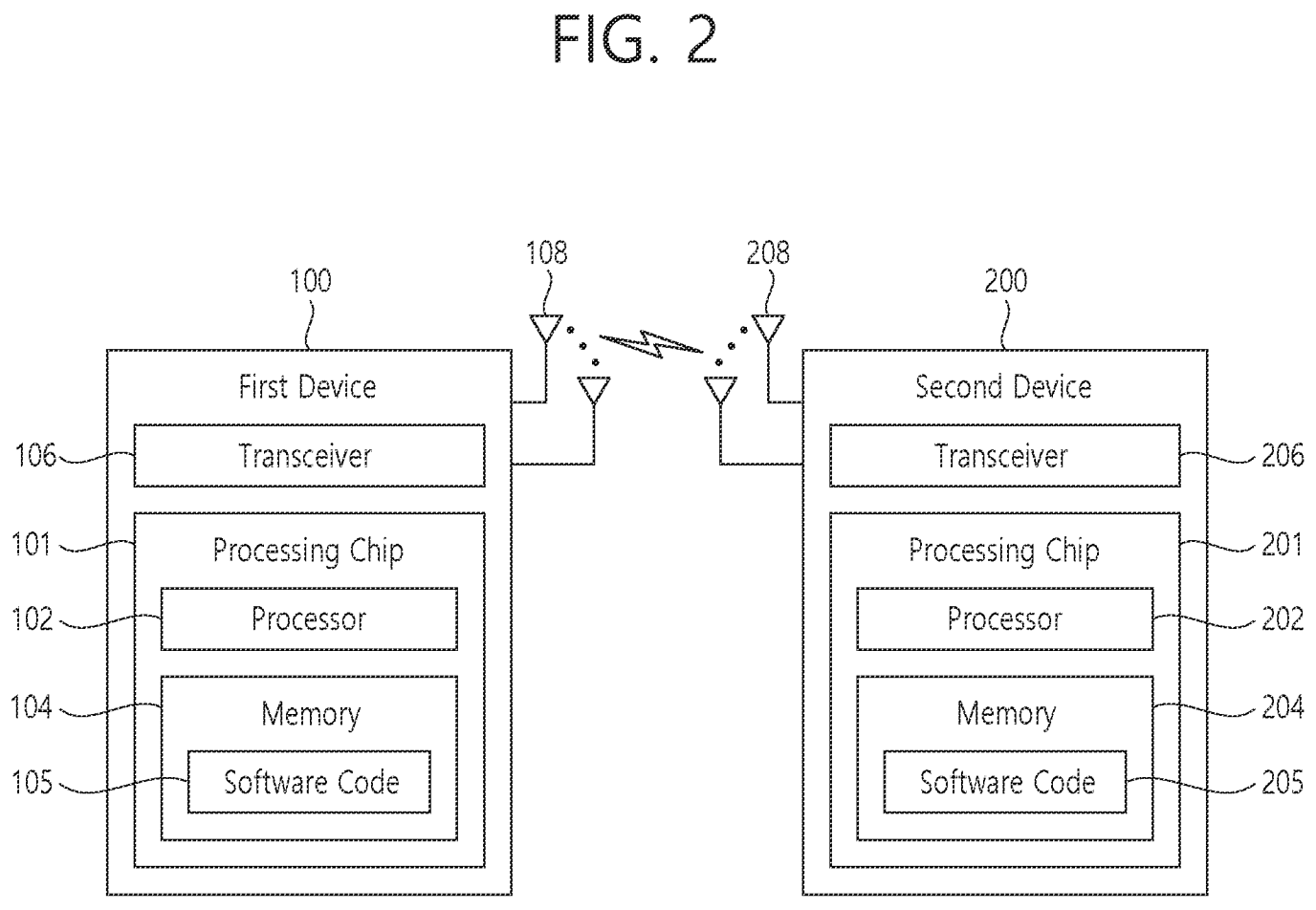

Second Device 200

- Transceiver 206
- Processing Chip 201
  - Processor 202
  - Memory 204
    - Software Code 205

208

108

First Device 100

- Transceiver 106
- Processing Chip 101
  - Processor 102
  - Memory 104
    - Software Code 105

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

| $I_1$ \ $I_2$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 13 | 26 | 39 | 52 | 65 | 78 | 90 | 77 | 64 | 51 | 38 | 25 | | | |
| 1 | | 1 | 14 | 27 | 40 | 53 | 66 | 79 | 89 | 76 | 63 | 50 | 37 | | | |
| 2 | | | 2 | 15 | 28 | 41 | 54 | 67 | 80 | 88 | 75 | 62 | 49 | | | |
| 3 | | | | 3 | 16 | 29 | 42 | 55 | 68 | 81 | 87 | 74 | 61 | | | |
| 4 | | | | | 4 | 17 | 30 | 43 | 56 | 69 | 82 | 86 | 73 | | | |
| 5 | | | | | | 5 | 18 | 31 | 44 | 57 | 70 | 83 | 85 | | | |
| 6 | | | | | | | 6 | 19 | 32 | 45 | 58 | 71 | 84 | | | |
| 7 | | | | | | | | 7 | 20 | 33 | 46 | 59 | 72 | | | |
| 8 | | | | | | | | | 8 | 21 | 34 | 47 | 60 | | | |
| 9 | | | | | | | | | | 9 | 22 | 35 | 48 | | | |
| 10 | | | | | | | | | | | 10 | 23 | 36 | | | |
| 11 | | | | | | | | | | | | 11 | 24 | | | |
| 12 | | | | | | | | | | | | | 12 | | | |
| 13 | | | | | | | | | | | | | | 91 | 94 | 96 |
| 14 | | | | | | | | | | | | | | | 92 | 95 |
| 15 | | | | | | | | | | | | | | | | 93 |

FIG. 16

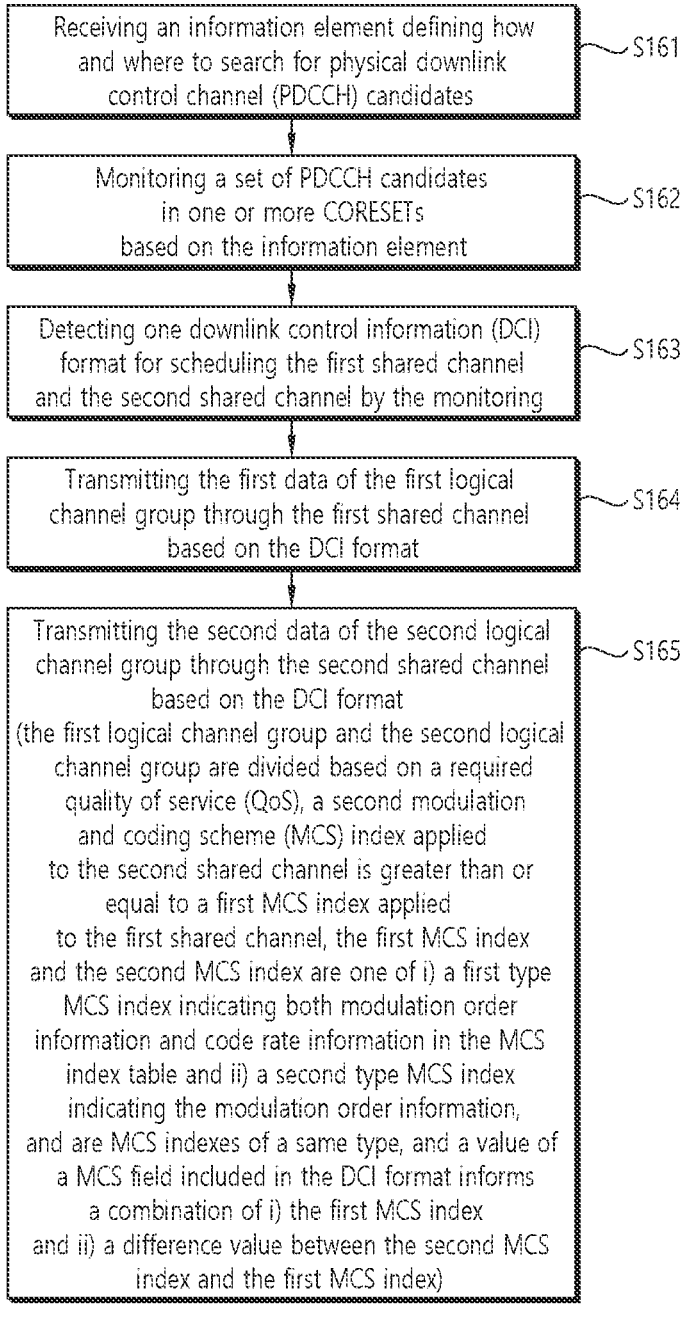

Receiving an information element defining how
and where to search for physical downlink
control channel (PDCCH) candidates     ~S161

Monitoring a set of PDCCH candidates
in one or more CORESETs
based on the information element     ~S162

Detecting one downlink control information (DCI)
format for scheduling the first shared channel
and the second shared channel by the monitoring     ~S163

Transmitting the first data of the first logical
channel group through the first shared channel
based on the DCI format     ~S164

Transmitting the second data of the second logical
channel group through the second shared channel
based on the DCI format
(the first logical channel group and the second logical
channel group are divided based on a required
quality of service (QoS), a second modulation
and coding scheme (MCS) index applied
to the second shared channel is greater than or
equal to a first MCS index applied
to the first shared channel, the first MCS index
and the second MCS index are one of i) a first type
MCS index indicating both modulation order
information and code rate information in the MCS
index table and ii) a second type MCS index
indicating the modulation order information,
and are MCS indexes of a same type, and a value of
a MCS field included in the DCI format informs
a combination of i) the first MCS index
and ii) a difference value between the second MCS
index and the first MCS index)     ~S165

FIG. 17

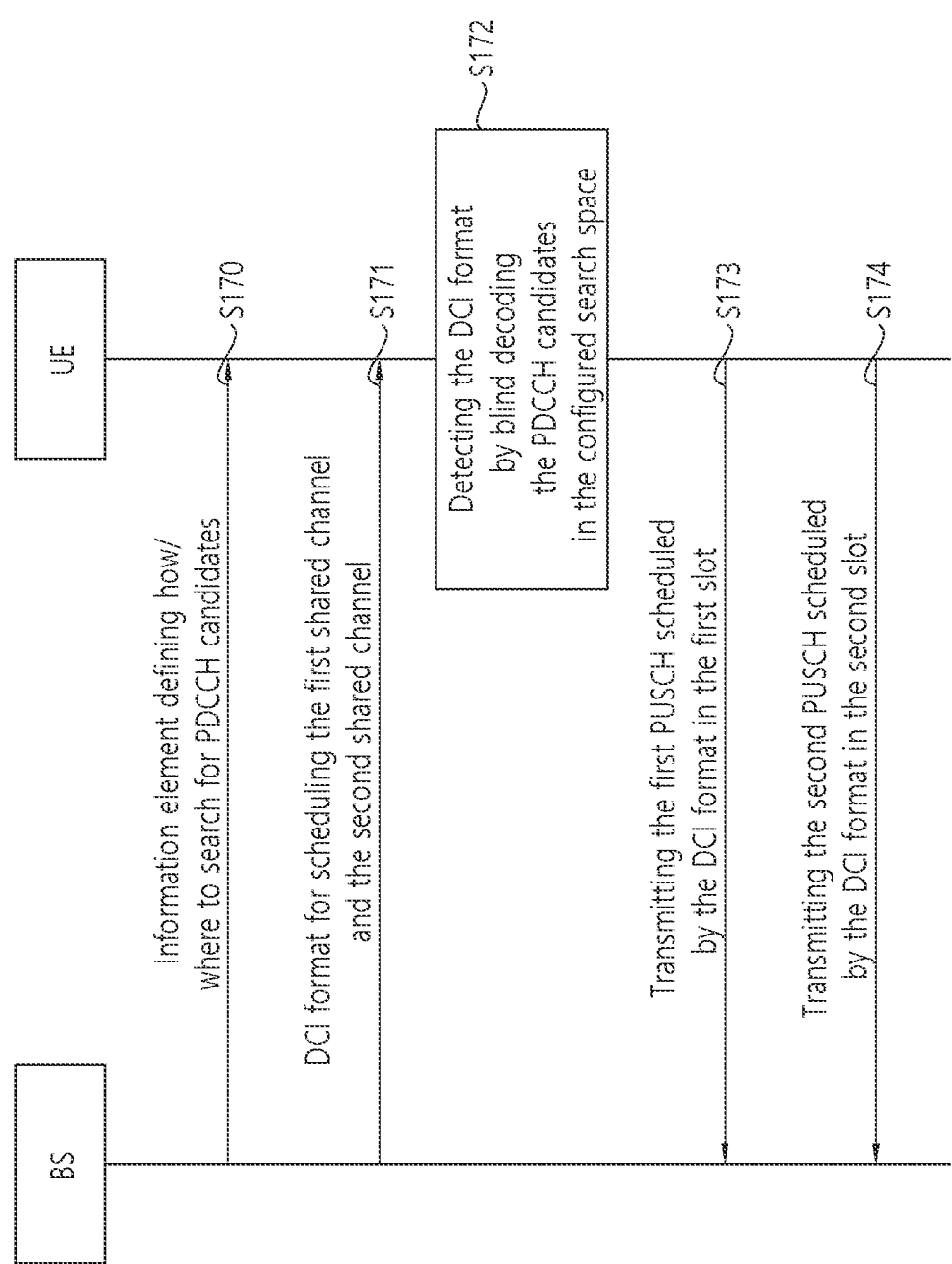

UE

BS

Information element defining how/
where to search for PDCCH candidates
S170

DCI format for scheduling the first shared channel
and the second shared channel
S171

Detecting the DCI format
by blind decoding
the PDCCH candidates
in the configured search space
S172

Transmitting the first PUSCH scheduled
by the DCI format in the first slot
S173

Transmitting the second PUSCH scheduled
by the DCI format in the second slot
S174

METHOD AND APPARATUS FOR DATA TRANSMISSION AND RECEPTION

CROSS-REFERENCE TO RELATED APPLICATIONS

This application is a National Stage application under 35 U.S.C. § 371 of International Application No. PCT/KR2022/005762, filed on Apr. 22, 2022. The disclosure of the prior application is incorporated by reference in its entirety.

BACKGROUND OF THE DISCLOSURE

Field of the Disclosure

The present specification relates to a method and apparatus for transmitting and receiving data in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc.

As data traffic of a cellular mobile communication system rapidly increases, a technology for transmitting data through unlicensed spectrum bands has been developed In unlicensed bands, since the frequency can be shared with devices operating in other communication systems, such as Wi-Fi devices, it is designed to use a channel access method based on an energy detection operation to enable coexistence between a plurality of radio access technologies. For example, LTE-LAA (Licensed Assisted Access) and NR-U support LBT (Listen Before Talk) technology that enables frequency sharing between a plurality of radio access technologies according to the CSMA/CA (Carrier Sense Multiple Access with Collision Avoidance) procedure.

Because it always involves LBT operation in order to transmit data in the unlicensed band, in a general transmission method of scheduling one PUSCH with one downlink control information (DCI), an uplink data transmission rate is greatly reduced.

Accordingly, a multi-TTI scheduling technology capable of scheduling a plurality of PUSCHs through one DCI is introduced in LTE-eLAA (enhanced LAA) and NR-U. Multiple TTI scheduling may be applied to not only PUSCH but also PDSCH scheduling.

However, in the conventional multi-TTI scheduling DCI technology, all PDSCHs or PUSCHs scheduled by one DCI are transmitted using the same modulation and coding scheme (MCS). That is, there is a problem of having the same physical transmission quality even if the transmission quality required for data transmitted through each shared channel is different.

SUMMARY OF THE DISCLOSURE

In order to solve the above problem, it is necessary to enable a plurality of data streams having different transmission qualities to be transmitted through a plurality of shared channels scheduled through one DCI.

In addition, it is necessary to inform the MCSs applied to the plurality of shared channels while reducing the bit size of the DCI as much as possible in terms of signaling overhead.

In order to solve the above problems, a method and apparatus for transmitting data in a wireless communication system are provided. A logical channel or data stream is divided into two groups according to QoS characteristics and sorted in ascending order of the target MCS. The logical channels or data streams arranged in ascending order of the target MCS are transmitted through a plurality of shared channels scheduled by one DCI. The MCSs of the two groups are one of a first type MCS index indicating both modulation order information and code rate information and a second type MCS index indicating modulation order information, and are limited to the same type of MCS indexes. The increase in the bit size of the DCI is minimized by using a method in which one integer representing a combination of i) the first MCS index and ii) the difference between the second MCS index and the first MCS index is notified through the DCI.

In another aspect, a terminal and a processing device for implementing the method, a computer readable medium (CRM) are provided.

In another aspect, a method performed by a base station is provided. The method includes transmitting one downlink control information (DCI) format for scheduling a first shared channel and a second shared channel, receiving first data of a first logical channel group through the first shared channel based on the DCI format, receiving second data of a second logical channel group through the second shared channel based on the DCI format. The first logical channel group and the second logical channel group are divided based on required QoS, the second MCS index applied to the second shared channel is greater than or equal to the first MCS index applied to the first shared channel, and the first MCS index and the second MCS index are one of a first type MCS index indicating both modulation order information and code rate information in an MCS index table and a second type MCS index indicating the modulation order information. They are MCS indexes of the same type. The value of the MCS field included in the DCI format informs a combination of i) the first MCS index and ii) a difference value between the second MCS index and the first MCS index.

In another aspect, a base station implementing the method is provided.

The present disclosure can have various advantageous effects.

It is possible to efficiently support high-speed multi-QoS data transmission while minimizing the overhead of a PDCCH carrying DCI.

In addition, by allocating radio resources differently according to the required physical transmission quality, it is possible to efficiently use radio resources and increase system capacity.

It is possible to efficiently support a service in which a plurality of data streams having different required QoS are transmitted in a large capacity.

Advantageous effects which can be obtained through specific embodiments of the present specification are not limited to the advantageous effects listed above. For example, there may be a variety of technical effects that a person having ordinary skill in the related art can understand and/or derive from the present specification. Accordingly, the specific effects of the present specification are not limited to those explicitly described herein, but may include various effects that may be understood or derived from the technical features of the present specification.

BRIEF DESCRIPTION OF THE DRAWINGS

FIG. 1 illustrates an example of a communication system to which implementations of the present specification is applied.

FIG. 2 shows an example of a wireless device to which the implementation of the present specification is applied.

FIG. 9 shows an example of a slot structure of a frame.

FIG. 12 is an example of dividing a plurality of logical channels into two groups, applying different MCSs to each, and transmitting the plurality of logical channels through a plurality of shared channels scheduled through one DCI.

FIG. 13 illustrates a case in which two MCS indexes are mapped to the MCSI-CI 122 of DCI.

FIG. 16 illustrates a data transmission method of a UE according to an embodiment of the present disclosure.

FIG. 17 illustrates a signaling process between a base station and a UE according to an embodiment of the present disclosure.

4

DESCRIPTION OF EXEMPLARY EMBODIMENTS

Figure 3:
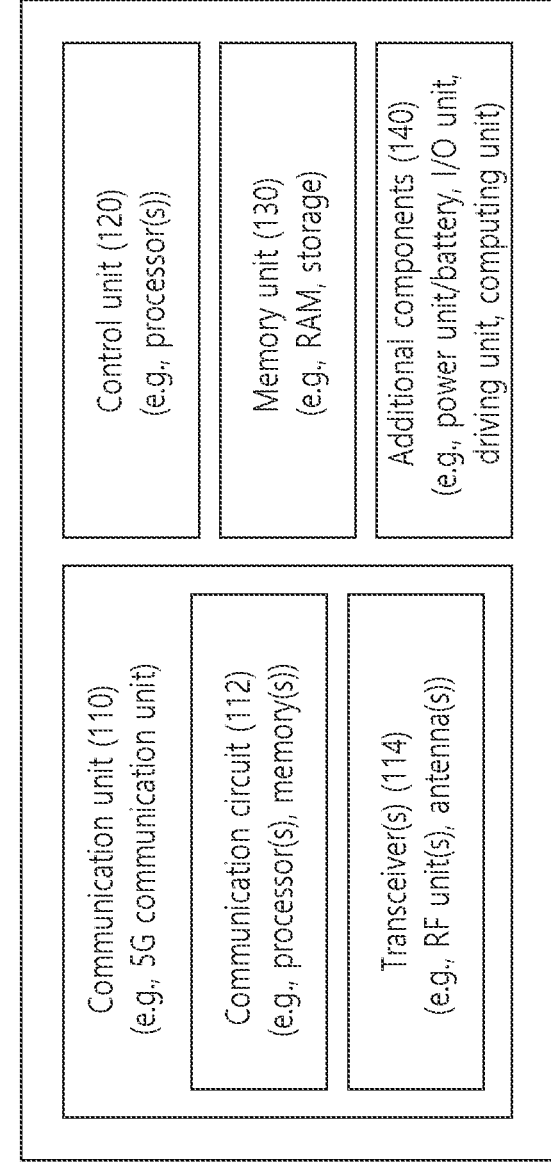
FIG. 3 shows another example of a wireless device to which the implementation of the present specification is applied.

Techniques, apparatuses, and systems to be described below may be applied to various wireless multiple access systems. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a system, and a Single Frequency Division Multiple Access (SC-FDMA) system. Carrier Frequency Division Multiple Access) systems, and MC-FDMA (Multi-Carrier Frequency Division Multiple Access) systems. CDMA may be implemented through a radio technology such as Universal Terrestrial Radio Access (UTRA) or CDMA2000. TDMA may be implemented through a radio technology such as Global System for Mobile communications (GSM), General Packet Radio Service (GPRS), or Enhanced Data rates for GSM Evolution (EDGE). OFDMA may be implemented through a wireless technology such as Institute of Electrical and Electronics Engineers (IEEE) 802.11 (Wi-Fi), IEEE 802.16 (WiMAX), IEEE 802.20, or Evolved UTRA (E-UTRA). UTRA is part of the Universal Mobile Telecommunications System (UMTS). 3rd Generation Partnership Project (3GPP) Long-Term Evolution (LTE) is a part of Evolved UMTS (E-UMTS) using E-UTRA. 3GPP LTE uses OFDMA in downlink (DL) and SC-FDMA in uplink (UL). Evolution of 3GPP LTE includes LTE-A (Advanced), LTE-A Pro, and/or 5G New Radio (NR).

For convenience of description, implementations of the present specification are mainly described in the context of a 3GPP-based wireless communication system. However, the technical characteristics of the present specification are not limited thereto. For example, the following detailed description is provided based on a mobile communication system corresponding to the 3GPP-based wireless communication system, but aspects of the present specification that are not limited to the 3GPP-based wireless communication system may be applied to other mobile communication systems.

For terms and techniques not specifically described among terms and techniques used in this specification, reference may be made to a wireless communication standard document issued before this specification.

In this specification, "A or B" may mean "only A", "only B", or "both A and B". In other words. "A or B" herein may be interpreted as "A and/or B". For example, "A, B or C" herein means "only A", "only B", "only C", or "any and any combination of A, B and C".

As used herein, a slash (/) or a comma (comma) may mean "and/or". For example, "A/B" may mean "A and/or B". Accordingly. "A/B" may mean "only A", "only B", or "both A and B". For example, "A, B, C" may mean "A, B, or C".

As used herein, "at least one of A and B" may mean "only A", "only B", or "both A and B". In addition, in this specification, the expression "at least one of A or B" or "at least one of A and/or B" means "at least one of A and B".

Also, as used herein, "at least one of A, B and C" means "only A", "only B", "only C", or "any combination of A, B and C". In addition, "at least one of A, B or C" or "at least one of A, B and/or C" means can mean "at least one of A, B and C".

In addition, parentheses used herein may mean "for example". Specifically, when displayed as "control information (PDCCH)". "PDCCH" may be proposed as an example of "control information". In other words. "control information" in the present specification is not limited to "PDCCH", and "PDCCH" may be proposed as an example of "control information". In addition, even when displayed as "control information (i.e., PDCCH)", "PDCCH" may be proposed as an example of "control information".

Technical features that are individually described in one drawing in this specification may be implemented individually or may be implemented at the same time.

Although not limited thereto, the various descriptions, functions, procedures, proposals, methods, and/or operation flowcharts disclosed herein may be applied to various fields requiring wireless communication and/or connection (e.g., 5G) between devices.

Hereinafter, the present specification will be described in more detail with reference to the drawings. In the following drawings and/or descriptions, the same reference numbers may refer to the same or corresponding hardware blocks, software blocks, and/or functional blocks unless otherwise indicated.

Figure 1:
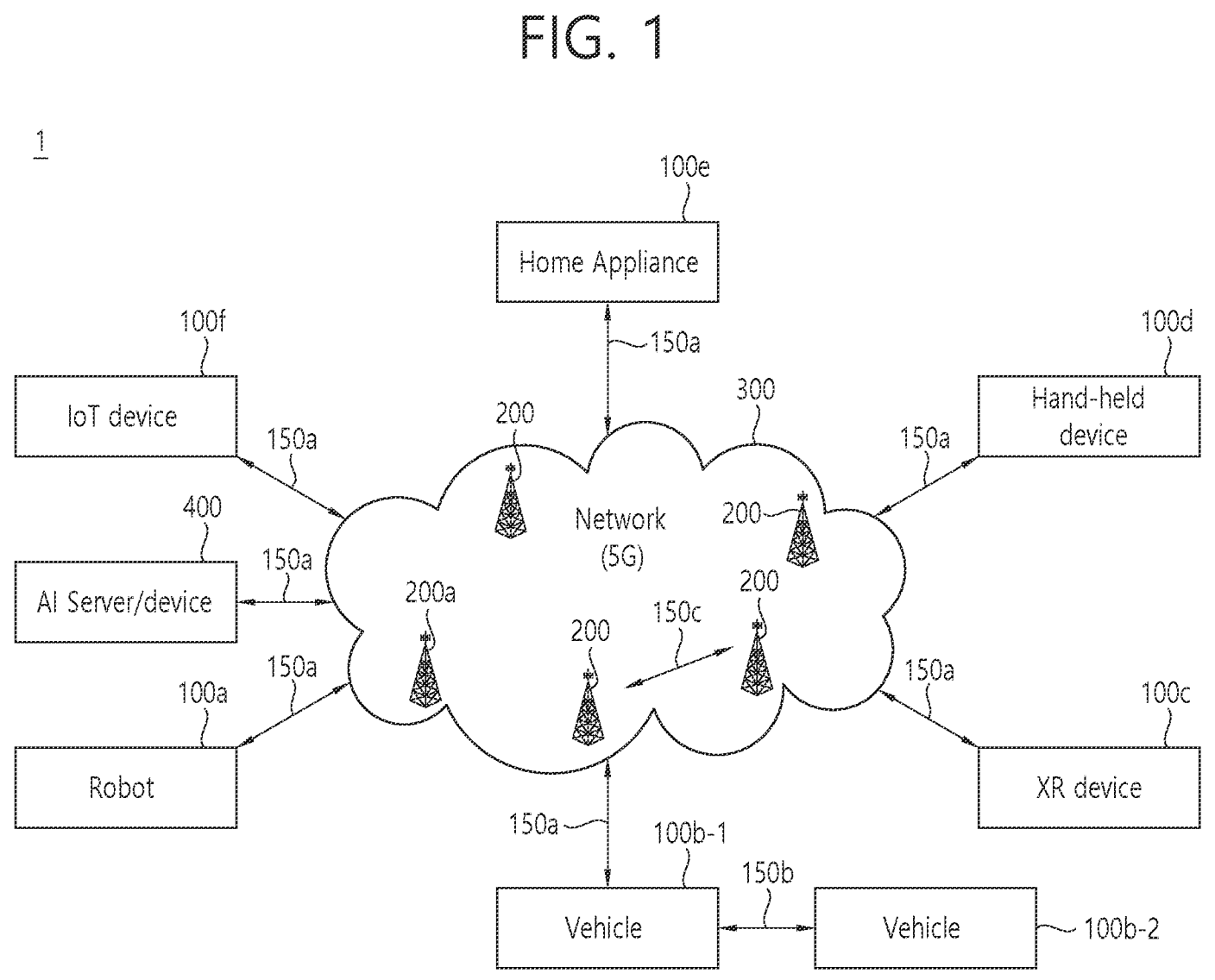

FIG. 1 shows an example of a communication system to which an implementation of the present specification is applied.

The 5G usage scenario shown in FIG. 1 is only an example, and the technical features of the present specification may be applied to other 5G usage scenarios not shown in FIG. 1.

The three main requirements categories for 5G are (1) enhanced Mobile BroadBand (eMBB) category. (2) massive Machine Type Communication (mMTC) category, and (3) ultra-reliable, low-latency communication. (URLLC: Ultra-Reliable and Low Latency Communications) category.

Referring to FIG. 1, the communication system 1 includes wireless devices 100a~100f, base station 200, and a network 300. Although FIG. 1 illustrates a 5G network as an example of the network of the communication system 1, the implementations of the present disclosure are not limited to the 5G system, and can be applied to the future communication system beyond the 5G system.

The BS 200 and the network 300 may be implemented as wireless devices and a specific wireless device may operate as a BS/network node with respect to other wireless devices.

The wireless devices 100a~100f, represent devices performing communication using radio access technology (RAT) (e.g., 5G New RAT (NR)) or Long-Term Evolution (LTE)) and may be referred to as communication/radio/5G devices. The wireless devices 100a~100f may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. The vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present specification, the wireless devices 100a~100f may be called user equipments (UEs). A user equipment (UE) may include, for example, a cellular phone, a smartphone, a laptop computer, a digital broadcast, a personal digital assistant (PDA), a portable multimedia player (PMP), a navigation system, a slate personal computer (PC), a tablet PC, an ultrabook, a vehicle, a vehicle having an autonomous traveling function, a connected car, an unmanned aerial vehicle (UAV), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or a financial device), a security device, a weather/environment device, a device related to a 5G service, or a device related to a fourth industrial revolution field.

For example, the unmanned aerial vehicle (UAV) may be an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a CCTV, a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a* and 150*b* may be established between the wireless devices 100*a* to 100*f*/BS 200-BS 200. Herein, the wireless communication/connections may be established through various RATs (e.g., 5G NR) such as uplink/downlink communication 150*a* and sidelink communication 150*b* (or D2D communication). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

AI refers to a field that studies artificial intelligence or a methodology that can create it, and machine learning refers to a field that defines various problems dealt with in the field of artificial intelligence and studies methodologies to solve them. Machine learning is also defined as an algorithm that improves the performance of a certain task through constant experience.

A robot can mean a machine that automatically handles or operates a task given by its own capabilities. In particular, a robot having a function of recognizing an environment and performing an operation by self-judgment may be referred to as an intelligent robot. Robots can be classified into industrial, medical, home, military, etc. according to the purpose or field of use. The robot may be provided with a driving unit including an actuator or a motor to perform various physical operations such as moving the robot joints. In addition, the movable robot includes a wheel, a brake, a propeller, and the like in the driving unit, and can travel on the ground or fly in the air through the driving unit.

Autonomous driving refers to a technology that drives by itself, and an autonomous driving vehicle refers to a vehicle that runs without or with minimal manipulation of a user. For example, autonomous driving may include all technologies that maintains a driving lane, technology that automatically adjusts speed such as adaptive cruise control, technology that automatically drives along a predetermined route, and technology that automatically sets a route when a destination is set etc. The vehicle includes a vehicle having only an internal combustion engine, a hybrid vehicle having both an internal combustion engine and an electric motor, and an electric vehicle having only an electric motor, and may include not only automobiles, but also trains, motorcycles, and the like. Autonomous vehicles can be viewed as robots with autonomous driving capabilities.

Augmented reality refers to VR, AR, and MR. VR technology provides objects and backgrounds in the real world only as CG images, AR technology provides virtual CG images on top of real objects. MR technology is a CG technology that mixes and combines virtual objects with the real world. MR technology is similar to AR technology in that it shows both real and virtual objects. However, there is a difference in that in AR technology, a virtual object is used in a form that complements a real object, whereas in MR technology, a virtual object and a real object are used with equal characteristics.

NR supports multiple numerology or, subcarrier spacing (SCS) to support various 5G services. For example, when the SCS is 15 KHz, wide area in traditional cellular bands may be supported. When the SCS is 30 KHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range". FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is. FR1 may include a frequency band of 6 GHZ (or 5850, 5900, 5925 MHZ, etc.) or more. For example, a frequency band of 6 GHZ (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the wireless communication technology implemented in the wireless device of the present specification may include narrowband IoT (NB-IOT) for low-power communication as well as LTE, NR, and 6G. For example, the NB-IOT technology may be an example of a LPWAN (Low Power Wide Area Network) technology, and may be implemented in standards such as LTE Cat NB1 and/or LTE Cat NB2, and is not limited to the above-mentioned name. Additionally or alternatively, the wireless communication technology implemented in the wireless device of the present specification may perform communication based on LTE-M technology. For example, the LTE-M technology may be an example of an LPWAN technology, and may be called by various names such as enhanced MTC (eMTC). For example, LTE-M technology may be implemented in at least one of various standards such as 1) LTE CAT 0, 2) LTE Cat M1, 3) LTE Cat M2, 4) LTE non-BL (Non-Bandwidth Limited), 5) LTE-MTC. 6) LTE MTC, and/or 7) LTE M, and is not limited to the above-described name. Additionally or alternatively, the wireless communication technology implemented in the wireless device of the present specification may include at least one of ZigBee, Bluetooth, and/or LPWAN in consideration of low-power communication, and it is not limited to the above-mentioned names. For example, the ZigBee technology may create PANs (Personal Area Networks) related to small/low-power digital communication based on various standards such as IEEE 802.15.4, and may be called by various names.

FIG. 2 shows an example of a wireless device to which the implementation of the present specification is applied.

Referring to FIG. 2, the first wireless device 100 and the second wireless device 200 may transmit/receive radio signals to/from an external device through various RATs (e.g., LTE and NR).

In FIG. 2, {first wireless device 100 and second wireless device 200} may correspond to at least one of {wireless devices 100a to 100f and base station 200}, {wireless device 100a to 100f and wireless devices 100a to 100f} and/or {base station 200 and base station 200} in FIG. 1.

The first wireless device 100 may include at least one transceiver, such as a transceiver 106, at least one processing chip, such as a processing chip 101, and/or one or more antennas 108.

Processing chip 101 may include at least one processor, such as processor 102, and at least one memory, such as memory 104. In FIG. 2, an example in which the memory 104 is included in the processing chip 101 is shown. Additionally and/or alternatively, the memory 104 may be located external to the processing chip 101.

The processor 102 may control the memory 104 and/or the transceiver 106 and may be configured to implement the descriptions, functions, procedures, suggestions, methods, and/or operational flow diagrams disclosed herein. For example, the processor 102 may process information in the memory 104 to generate first information/signal, and transmit a wireless signal including the first information/signal through the transceiver 106. The processor 102 may receive a wireless signal including the second information/signal through the transceiver 106, and store information obtained by processing the second information/signal in the memory 104.

Memory 104 may be operatively coupled to processor 102. Memory 104 may store various types of information and/or instructions. The memory 104 may store software code 105 that, when executed by the processor 102, implements instructions that perform the descriptions, functions, procedures, suggestions, methods, and/or operational flow diagrams disclosed herein. For example, the software code 105 may implement instructions that, when executed by the processor 102, perform the descriptions, functions, procedures, suggestions, methods, and/or operational flow diagrams disclosed herein. For example, software code 105 may control processor 102 to perform one or more protocols. For example, software code 105 may control processor 102 to perform one or more air interface protocol layers.

Here, the processor 102 and the memory 104 may be part of a communication modem/circuit/chip designed to implement a RAT (e.g., LTE or NR). The transceiver 106 may be coupled to the processor 102 to transmit and/or receive wireless signals via one or more antennas 108. Each transceiver 106 may include a transmitter and/or a receiver. The transceiver 106 may be used interchangeably with a radio frequency (RF) unit. In this specification, the first wireless device 100 may represent a communication modem/circuit/chip.

The second wireless device 200 may include at least one transceiver, such as a transceiver 206, at least one processing chip, such as a processing chip 201, and/or one or more antennas 208.

Processing chip 201 may include at least one processor, such as processor 202, and at least one memory, such as memory 204. In FIG. 2 shows an example in which the memory 204 is included in the processing chip 201. Additionally and/or alternatively, the memory 204 may be located external to the processing chip 201.

The processor 202 may control the memory 204 and/or the transceiver 206 and may be configured to implement the descriptions, functions, procedures, suggestions, methods, and/or operational flow diagrams disclosed herein. For example, the processor 202 may process the information in the memory 204 to generate third information/signal, and transmit a wireless signal including the third information/signal through the transceiver 206. The processor 202 may receive a radio signal including the fourth information/signal through the transceiver 206, and store information obtained by processing the fourth information/signal in the memory 204.

Memory 204 may be operatively coupled to processor 202. Memory 204 may store various types of information and/or instructions. The memory 204 may store software code 205 that, when executed by the processor 202, implements instructions that perform the descriptions, functions, procedures, suggestions, methods, and/or operational flow diagrams disclosed herein. For example, the software code 205 may implement instructions that, when executed by the processor 202, perform the descriptions, functions, procedures, suggestions, methods, and/or operational flow diagrams disclosed herein. For example, software code 205 may control processor 202 to perform one or more protocols. For example, software code 205 may control processor 202 to perform one or more air interface protocol layers.

Here, the processor 202 and the memory 204 may be part of a communication modem/circuit/chip designed to implement a RAT (e.g., LTE or NR). The transceiver 206 may be coupled to the processor 202 to transmit and/or receive wireless signals via one or more antennas 208. Each transceiver 206 may include a transmitter and/or a receiver. The transceiver 206 may be used interchangeably with the RF unit. In this specification, the second wireless device 200 may represent a communication modem/circuit/chip.

Hereinafter, hardware elements of the wireless devices 100 and 200 will be described in more detail. Although not limited thereto, one or more protocol layers may be implemented by one or more processors 102, 202. For example, the one or more processors 102, 202 may implement one or more layers (e.g., functional layers such as a physical (PHY) layer, a Media Access Control (MAC) layer, a Radio Link Control (RLC) layer, a Packet Data Convergence Protocol (PDCP) layer, a Radio Resource Control (RRC) layer or a Service Data Adaptation Protocol (SDAP) layer). The one or more processors 102, 202 generate one or more Protocol Data Units (PDUs) and/or one or more Service Data Units (SDUs) according to the descriptions, functions, procedures, proposals, methods, and/or operational flow diagrams disclosed herein. One or more processors 102, 202 may generate messages, control information, data, or information in accordance with the descriptions, functions, procedures, proposals, methods, and/or operational flow diagrams disclosed herein. The one or more processors 102, 202 may configure a signal including a PDU, SDU, message, control information, data or information (e.g., a baseband signal) and provide it to one or more transceivers (106, 206). One or more processors 102, 202 may receive signals (e.g., baseband signals) from one or more transceivers 106, 206, PDU, SDU, message, control information, data or information may be obtained according to the description, function, procedure, proposal, method, and/or operation flowchart disclosed herein.

One or more processors 102, 202 may be referred to as controllers, microcontrollers, microprocessors, and/or microcomputers. One or more processors 102, 202 may be implemented by hardware, firmware, software, and/or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), and/or one or more Field Programmable Gates (FPGAs) Arrays) may be included in one or more processors 102, 202. The descriptions, functions, procedures, suggestions, methods, and/or flow diagrams disclosed herein may be implemented using firmware and/or software, and the firmware and/or software may be implemented to include modules, procedures, functions. Firmware or software configured to perform the descriptions, functions, procedures, suggestions, methods, and/or operational flow charts disclosed herein may be included in one or more processors 102, 202, or stored in one or more memories 104, 204, and it may be driven by the above processors 102 and 202. The descriptions, functions, procedures, proposals, methods, and/or flow diagrams disclosed herein may be implemented using firmware or software in the form of code, instructions, and/or sets of instructions.

One or more memories 104, 204 may be coupled with one or more processors 102, 202 and may store various forms of data, signals, messages, information, programs, code, instructions, and/or instructions. The one or more memories 104, 204 may include read-only memory (ROM), random access memory (RAM), erasable programmable ROM (EPROM), flash memory, hard drives, registers, cache memory, computer readable storage media and/or it may consist of a combination of these. One or more memories 104, 204 may be located inside and/or external to one or more processors 102, 202. In addition, one or more memories 104, 204 may be coupled to one or more processors 102, 202 through various technologies, such as wired or wireless connections.

The one or more transceivers 106, 206 may transmit user data, control information, wireless signals/channels, etc referred to in the descriptions, functions, procedures, suggestions, methods, and/or operational flow diagrams disclosed herein to one or more other devices. The one or more transceivers 106, 206 may receive user data control information, radio signals/channels, etc. referred to in the descriptions, functions, procedures, suggestions, methods, and/or flow charts disclosed herein, from one or more other devices. For example, one or more transceivers 106, 206 may be coupled to one or more processors 102, 202 and may transmit and receive wireless signals. For example, one or more processors 102, 202 may control one or more transceivers 106, 206 to transmit user data, control information, wireless signals, etc. to one or more other devices. In addition, one or more processors 102, 202 may control one or more transceivers 106, 206 to receive user data, control information, radio signals, etc. from one or more other devices.

One or more transceivers 106, 206 may be coupled to one or more antennas 108, 208. One or more transceivers 106, 206 may be configured to transmit and receive to user data, control information, radio signals/channels referred to in the descriptions, functions, procedures, proposals, methods, and/or operational flow diagrams disclosed herein via one or more antennas 108, 208. Herein, the one or more antennas 108 and 208 may be a plurality of physical antennas or a plurality of logical antennas (e.g., antenna ports).

The one or more transceivers 106 and 206 may convert received user data, control information, radio signals/channels, etc. from RF band signals to baseband signals to process the received user data, control information, radio signals/channels, etc. using the one or more processors 102, 202. One or more transceivers 106 and 206 may convert user data, control information, radio signals/channels, etc. processed using one or more processors 102 and 202 from baseband signals to RF band signals. To this end, one or more transceivers 106, 206 may include (analog) oscillators and/or filters. For example, one or more transceivers 106, 206 up-convert OFDM baseband signals to OFDM signals via (analog) oscillators and/or filters under the control of one or more processors 102, 202, and may transmit an up-converted OFDM signal at a carrier frequency. One or more transceivers (106, 206) receive the OFDM signal at the carrier frequency and down-convert the OFDM signal to an OFDM baseband signal through an (analog) oscillator and/or filter under the control of one or more processors (102, 202).

In the implementation of the present specification, the UE may operate as a transmitting device in uplink (UL) and as a receiving device in downlink (DL). In the implementation of the present specification, the base station may operate as a receiving device in the UL and a transmitting device in the DL. Hereinafter, for technical convenience, it is mainly assumed that the first wireless device 100 operates as a UE and the second wireless device 200 operates as a base station. For example, the processor 102 connected to, mounted on, or released to the first wireless device 100 may be configured to control the transceiver 106 to perform a UE operation according to an implementation of the present specification or configured to perform a UE operation according to an implementation of the present specification. The processor 202 connected to, mounted on, or released to the second wireless device 200 may be configured to control the transceiver 206 to perform a BS operation according to an implementation of the present specification or configured to perform a BS operation according to an implementation of the present specification.

In this specification, the base station may be referred to as another term such as a Node B (Node B), an eNode B (eNB), a gNB, and the like.

FIG. 3 shows another example of a wireless device to which the implementation of the present specification is applied.

The wireless device may be implemented in various forms according to usage examples/services.

Referring to FIG. 3, the wireless devices 100 and 200 may correspond to the wireless devices 100 and 200 of FIG. 2, and may be configured by various components, devices/parts and/or modules. For example, each wireless device 100, 200 may include a communication device 110, a control device 120, a memory device 130, and an additional component 140. The communication device 110 may include communication circuitry 112 and a transceiver 114. For example, communication circuitry 112 may include one or more processors 102, 202 of FIG. 2 and/or one or more memories 104, 204 of FIG. 2. For example, transceiver 114 may include one or more transceivers 106, 206 of FIG. 2 and/or one or more antennas 108, 208 of FIG. 2. The control device 120 is electrically connected to the communication device 110, the memory device 130, and the additional component 140, and controls the overall operation of each wireless device 100, 200. For example, the control device 120 may control the electrical/mechanical operation of each of the wireless devices 100 and 200 based on the program/code/command/information stored in the memory device 130. The control device 120 transmits information stored in the memory device 130 to the outside (e.g., other communication devices) through the communication device 110 through a wireless/wired interface, or the control device 120 may store information received from the outside (e.g., other communication devices) through the communication device 110 through the wireless/wired interface in the memory device 130.

The additional component 140 may be variously configured according to the type of the wireless device 100 or 200. For example, the additional component 140 may include at least one of a power unit/battery, an input/output (I/O)) device (e.g., an audio I/O port, a video I/O port), a drive unit, and a computing device. The wireless devices 100 and 200 may be implemented, not limited to, a robot (100*a* in FIG. 1), a vehicle (100*b*-1 and 100*b*-2 in FIG. 1), an XR device (100*c* in FIG. 1), and a portable device (100*d* in FIG. 1), home appliances (100*e* in FIG. 1), IoT devices (100*f* in FIG. 1), digital broadcast terminals, hologram devices, public safety devices, MTC devices, medical devices, fintech devices (or financial devices), security devices, a climate/environment device, an AI server/device (400 in FIG. 1), a base station (200 in FIG. 1), and a network node. The wireless devices 100 and 200 may be used in a moving or fixed location according to usage examples/services.

In FIG. 3, all of the various components, devices/parts and/or modules of the wireless devices 100 and 200 may be connected to each other via a wired interface, or at least some of them may be wirelessly connected via the communication device 110. For example, in each of the wireless devices 100 and 200, the control device 120 and the communication device 110 are connected by wire, and the control device 120 and the first device (e.g., 130 and 140) may be wirelessly connected through the communication device 110. Each component, device/portion and/or module within the wireless device 100, 200 may further include one or more elements. For example, the control device 120 may be configured by one or more processor sets. For example, the control device 120 may be configured by a set of a communication control processor, an application processor (AP), an electronic control unit (ECU), a graphic processing unit, and a memory control processor. As another example, the memory device 130 may be configured by RAM, dynamic RAM (DRAM), ROM, flash memory, volatile memory, non-volatile memory, and/or a combination thereof.

Figure 4:
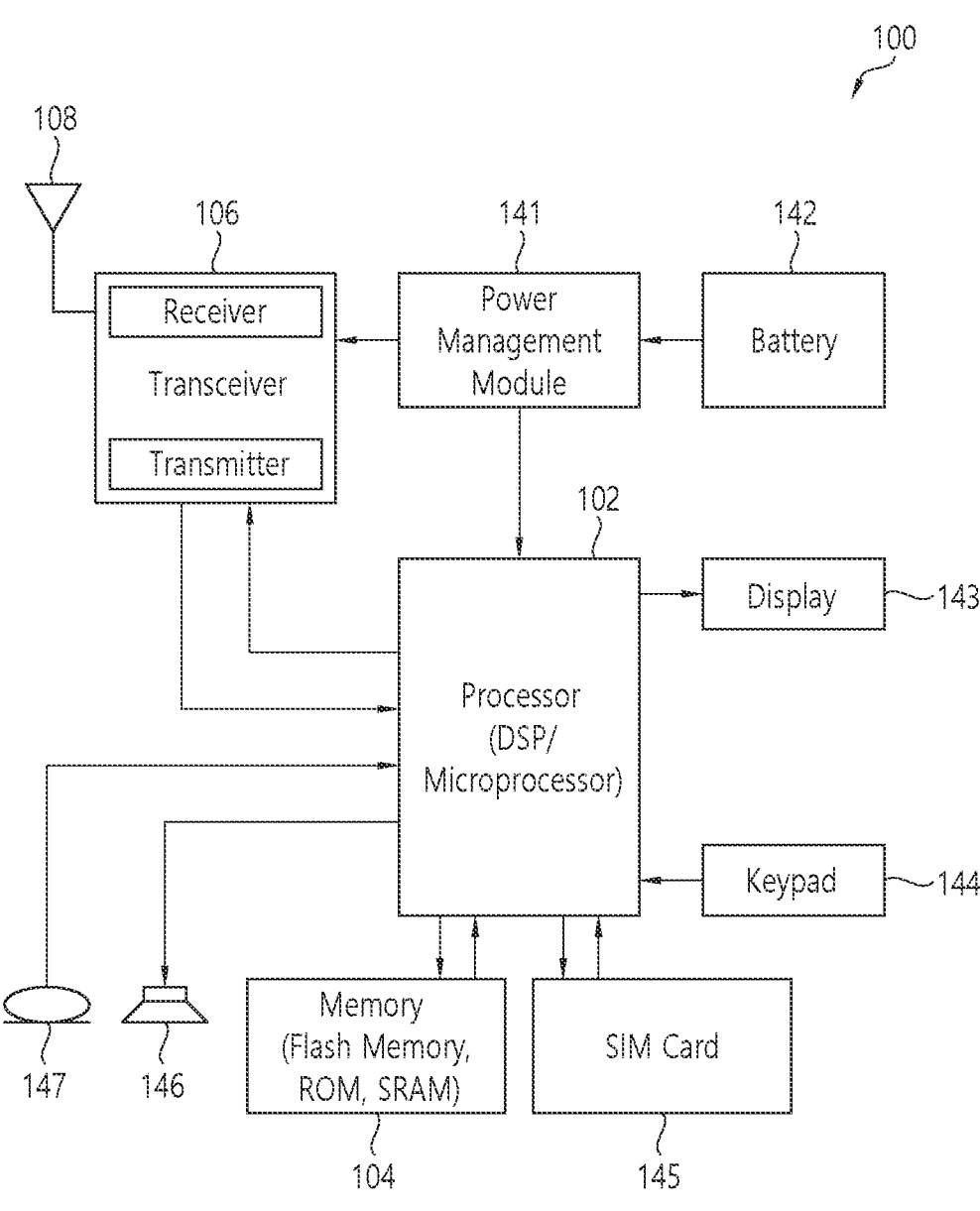
FIG. 4 shows an example of a UE to which the implementation of the present specification is applied.

FIG. 4 shows an example of a UE to which the implementation of the present specification is applied.

Referring to FIG. 4, the UE 100 may correspond to the first wireless device 100 of FIG. 2 and/or the wireless device 100 or 200 of FIG. 3.

The UE 100 may include a processor 102, a memory 104, a transceiver 106, one or more antennas 108, a power management module 141, a battery 142, a display 143, a keypad 144, a SIM (Subscriber Identification Module) card 145, a speaker 146, and a microphone 147.

The processor 102 may be configured to implement the descriptions, functions, procedures, suggestions, methods, and/or operational flow diagrams disclosed herein. The processor 102 may be configured to control one or more other components of the UE 100 to implement the descriptions, functions, procedures, suggestions, methods, and/or operational flow diagrams disclosed herein. A layer of air interface protocol may be implemented in the processor 102. The processor 102 may include an ASIC, other chipset, logic circuitry, and/or data processing device. The processor 102 may be an application processor. The processor 102 may include at least one of a DSP, a central processing unit (CPU), a graphics processing unit (GPU), and a modem (modulator and demodulator).

The memory 104 is operatively coupled to the processor 102, and stores various information for operating the processor 102. Memory 104 may include ROM, RAM, flash memory, memory cards, storage media, and/or other storage devices. When the implementation is implemented in software, the techniques described herein may be implemented using modules (e.g., procedures, functions, etc.) that perform the descriptions, functions, procedures, suggestions, methods, and/or operational flow diagrams disclosed herein. Modules may be stored in memory 104 and executed by processor 102. The memory 104 may be implemented within the processor 102 or external to the processor 102. In this case, it may be communicatively coupled to the processor 102 through various methods known in the art.

The transceiver 106 is operatively coupled with the processor 102 and transmits and/or receives wireless signals. The transceiver 106 includes a transmitter and a receiver. The transceiver 106 may include baseband circuitry for processing radio frequency signals. The transceiver 106 controls one or more antennas 108 to transmit and/or receive wireless signals.

The power management module 141 manages power of the processor 102 and/or the transceiver 106. The battery 142 supplies power to the power management module 141.

The display 143 outputs the result processed by the processor 102. Keypad 144 receives input for use by processor 102. The keypad 144 may be displayed on the display 143.

The SIM card 145 is an integrated circuit for securely storing an International Mobile Subscriber Identity (IMSI) and related keys, and is used to identify and authenticate subscribers in a mobile phone device such as a mobile phone or computer. It is also possible to store contact information on many SIM cards.

The speaker 146 outputs sound related results processed by the processor 102. Microphone 147 receives sound related input for use by processor 102.

Figure 5:
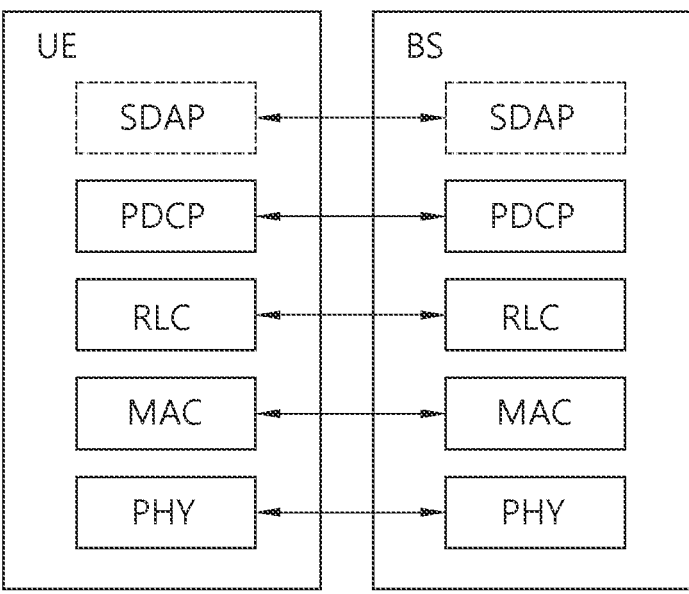
FIG. 5 shows an example of an air interface user plane protocol stack between a UE and a BS.

FIG. 5 shows an example of an air interface user plane protocol stack between a UE and a BS. Referring to FIG. 5, the user plane protocol stack may be divided into a layer 1 (i.e., a PHY layer) and a layer 2. The user plane refers to a path through which data generated in the application layer, for example, voice data or Internet packet data is transmitted.

Figure 6:
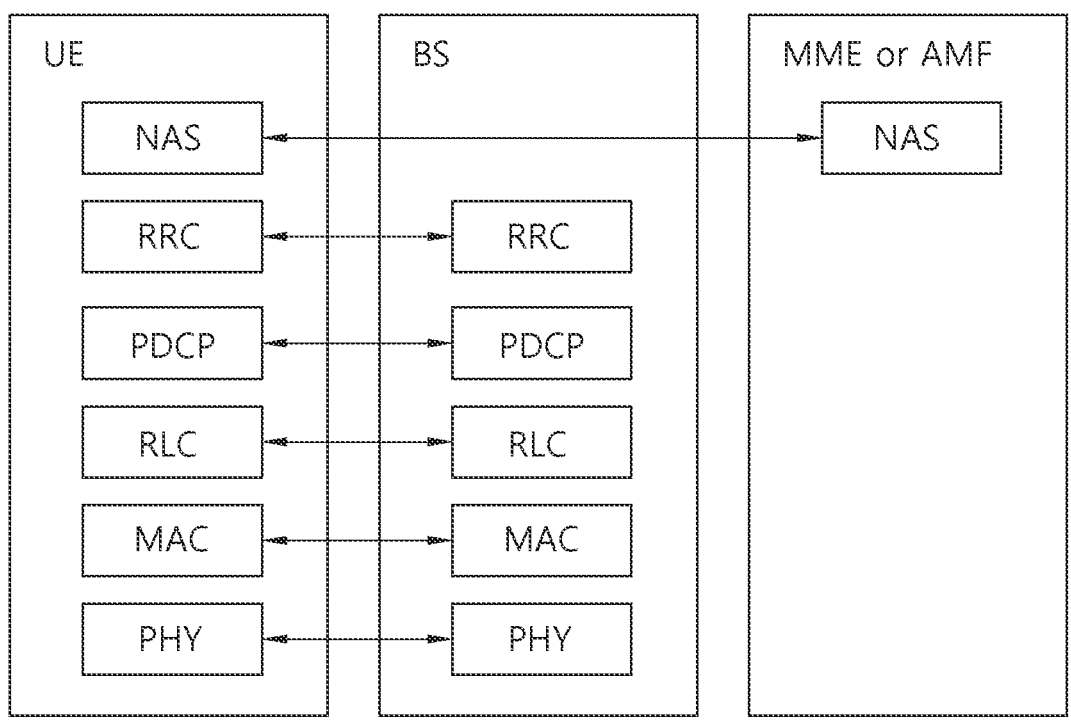
FIG. 6 shows an example of a radio interface control plane protocol stack between a UE and a BS.

FIG. 6 shows an example of a radio interface control plane protocol stack between a UE and a BS. The control plane refers to a path through which a control message used by the UE and the network to manage a call is transmitted. Referring to FIG. 6, the control plane protocol stack may be divided into a layer 1 (i.e., a PHY layer), a layer 2, a layer 3 (e.g., an RRC layer), and a non-access stratum (NAS) layer. Layer 1, Layer 2, and Layer 3 are referred to as Access Stratum (AS).

In the 3GPP LTE system, Layer 2 is divided into sublayers of MAC, RLC, and PDCP. In the 3GPP NR system, Layer 2 is divided into sublayers of MAC, RLC, PDCP and SDAP. The PHY layer provides a transport channel to the MAC sublayer, the MAC sublayer provides a logical channel to the RLC sublayer, the RLC sublayer provides an RLC channel to the PDCP sublayer, and the PDCP sublayer provides a radio bearer to the SDAP sublayer. The SDAP sublayer provides QoS (Quality Of Service) flows to the 5G core network.

The main services and functions of the MAC sublayer in the 3GPP NR system include mapping between logical channels and transport channels: multiplexing/demultiplexing MAC SDUs belonging to one or another logical channel to/from a Transport Block (TB) delivered to/from a physical layer on a transport channel: reporting scheduling information: error correction via Hybrid Automatic Repeat Request (HARQ) (one HARQ entity per cell in case of CA (Carrier Aggregation)); priority processing between UEs by dynamic scheduling; priority processing between logical channels of one UE by logical channel prioritization; and padding. A single MAC entity may support multiple numerologies, transmission timings and cells. Mapping constraints in logical channel prioritization control the numerologies, cells, and transmission timing that logical channels can use.

MAC provides various types of data transmission services. To accommodate different kinds of data transfer services, different types of logical channels are defined. That is, each logical channel supports the transmission of a specific type of information. Each logical channel type is defined according to the type of information being transmitted. Logical channels are classified into two groups: control channels and traffic channels. The control channel is used only for transmission of control plane information, and the traffic channel is used only for transmission of user plane information. A Broadcast Control Channel (BCCH) is a downlink logical channel for broadcasting system control information. A Paging Control Channel (PCCH) is a downlink logical channel for transmitting paging information, system information change notification, and indication of an ongoing Public Warning Service (PWS) broadcast. A common control channel (CCCH) is a logical channel for transmitting control information between a UE and a network, and is used for a UE without an RRC connection to the network. A DCCH (Dedicated Control Channel) is a point-to-point bidirectional logical channel for transmitting dedicated control information between a UE and a network, and is used by a UE having an RRC connection. A Dedicated Traffic Channel (DTCH) is a point-to-point logical channel dedicated to one UE for transmitting user information. DTCH may exist in both uplink and downlink. The following connection exists between the logical channel and the transport channel in the downlink. The BCCH may be mapped to a broadcast channel (BCH), the BCCH may be mapped to a downlink shared channel (DL-SCH), the PCCH may be mapped to a paging channel (PCH), and the CCCH may be mapped to the DL-SCH, DCCH may be mapped to DL-SCH, and DTCH may be mapped to DL-SCH. The following connection exists between the logical channel and the transport channel in the uplink. The CCCH may be mapped to an Uplink Shared Channel (UL-SCH), the DCCH may be mapped to the UL-SCH, and the DTCH may be mapped to the UL-SCH.

The RLC sublayer supports three transmission modes: TM (Transparent Mode), UM (Unacknowledged Mode), and AM (Acknowledged Mode). RLC configuration is done for each logical channel that does not depend on the numerology and/or transmission period. In the 3GPP NR system, the main services and functions of the RLC sublayer depend on the transmission mode, and include the transmission of the upper layer PDU: sequence numbering independent of that in PDCP (UM and AM): error correction via ARQ (AM only) RLC SDU splitting (AM and UM) and repartitioning (AM only); reassembly of SDUs (AM and UM): duplicate detection (AM only); RLC SDU discard (AM and UM); RLC re-establishment: and protocol error detection (AM only).

In the 3GPP NR system, the main services and functions of the PDCP sublayer for the user plane include: sequence numbering: header compression and decompression using ROHC (Robust Header Compression); user data transmission: reordering and duplicate detection: in-order delivery: PDCP PDU routing (for split bearers); retransmission of PDCP SDUs: encryption, decryption and integrity protection; PDCP SDU discard: PDCP re-establishment and data recovery for RLC AM: PDCP status report for RLC AM: replication of PDCP PDUs and indication of abort replication to lower layers. The main services and functions of the PDCP sublayer for the control plane include: sequence numbering: encryption, decryption and integrity protection: control plane data transmission: reordering and duplicate detection; delivery in order: replication of PDCP PDUs and indication of abort replication to lower layers.

The main services and functions of SDAP in the 3GPP NR system include: mapping between QoS flows and data radio bearers: an indication of QoS Flow ID (QFI) in both DL and UL packets. A single protocol entity in SDAP is configured for each individual PDU session.

In the 3GPP NR system, the main services and functions of the RRC sublayer include: broadcasting of system information related to AS and NAS, paging initiated by SGC or NG-RAN; establishment, maintenance and release of RRC connection between the UE and the NG-RAN; security features including key management: establishment, configuration, maintenance and release of a Signaling Radio Bearer (SRB) and a Data Radio Bearer (DRB): mobility functions (including handover and context transfer, UE cell selection and reselection and control of cell selection and reselection, inter-RAT mobility); QoS management function: UE measurement report and report control: detection and recovery of radio link failures: sending NAS messages to/from the UE to/from the NAS FIG. 7 illustrates physical channels and general signal transmission used in a 3GPP system.

Figure 7:
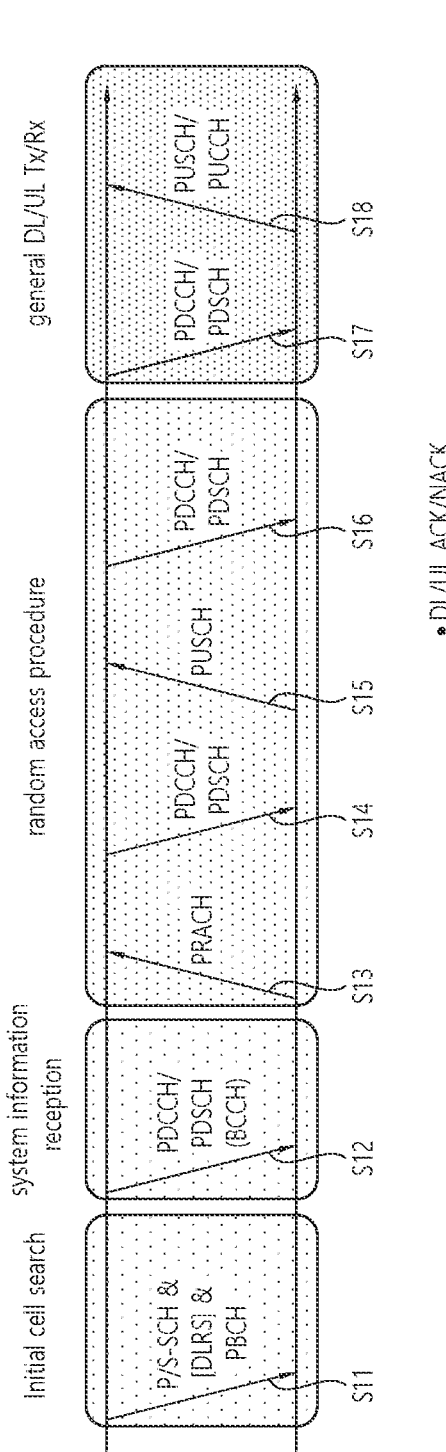
FIG. 7 illustrates physical channels and general signal transmission used in a 3GPP system.

Referring to FIG. 7, in a wireless communication system, a UE receives information from a base station through a downlink (DL), and the UE transmits information to a base station through an uplink (UL). The information transmitted and received between the base station and the UE includes data and various control information, and various physical channels exist according to the type/use of the information they transmit and receive.

When the UE is powered on or newly enters a cell, the UE performs an initial cell search operation such as synchronizing with the base station (S11). To this end, the UE receives a primary synchronization signal (PSS) and a secondary synchronization signal (SSS) from the base station, synchronizes with the base station, and obtains information such as a cell ID. Thereafter, the UE may receive a physical broadcast channel (PBCH) from the base station to obtain intra-cell broadcast information. Meanwhile, the UE may receive a downlink reference signal (DL RS) in the initial cell search step to check the downlink channel state.

After the initial cell search, the UE may receive a Physical Downlink Control Channel (PDCCH) and a Physical Downlink Control Channel (PDSCH) according to information carried on the PDCCH to obtain more specific system information (S12).

On the other hand, when accessing the base station for the first time or there is no radio resource for signal transmission, the UE may perform a random access procedure (RACH) to the base station (S13 to S16). To this end, the UE transmits a specific sequence as a preamble through a Physical Random Access Channel (PRACH) (S13 and S15), a response message ((Random Access Response (RAR) message) for the preamble may be received through the PDCCH and the corresponding PDSCH. In the case of contention-based RACH, a contention resolution procedure may be additionally performed (S16).

After performing the procedure as described above, the UE may perform PDCCH/PDSCH reception (S17) and Physical Uplink Shared Channel (PUSCH)/Physical Uplink Control Channel (PUCCH) transmission (S18) as a general uplink/downlink signal transmission procedure. In particular, the UE may receive downlink control information (DCI) through the PDCCH. Here, the DCI includes control information such as resource allocation information for the UE, and different formats may be applied according to the purpose of use.

On the other hand, the control information transmitted by the UE to the base station through the uplink or received by the UE from the base station is a downlink/uplink ACK/NACK signal, a channel quality indicator (CQI), a precoding matrix index (PMI), and a rank indicator (RI) and the like. The UE may transmit the above-described control information such as CQI/PMI/RI through PUSCH and/or PUCCH.

<Structure of Uplink and Downlink Channels>
1. Downlink Channel Structure

The base station may transmit a related signal to the UE through a downlink channel to be described later, and the UE may receive a related signal from the base station through a downlink channel to be described later.

(1) Physical Downlink Shared Channel (PDSCH)

PDSCH carries downlink data (e.g., DL-shared channel transport block, DL-SCH TB), and modulation methods such as Quadrature Phase Shift Keying (QPSK). 16 Quadrature Amplitude Modulation (QAM), 64 QAM, and 256 QAM are applied to the PDSCH. A codeword is generated by encoding a transport block (TB). A PDSCH can carry multiple codewords. Scrambling and modulation mapping are performed for each codeword, and modulation symbols generated from each codeword are mapped to one or more layers (Layer mapping). Each layer is mapped to a resource together with a demodulation reference signal (DMRS), is generated as an OFDM symbol signal, and is transmitted through a corresponding antenna port.

(2) Physical Downlink Control Channel (PDCCH)

The PDCCH carries downlink control information (DCI) and a QPSK modulation method is applied. One PDCCH is composed of 1, 2, 4, 8, 16 CCEs (Control Channel Elements) according to an Aggregation Level (AL). One CCE consists of six REGs (Resource Element Groups). One REG is defined as one OFDM symbol and one (P)RB.

The UE obtains DCI transmitted through the PDCCH by performing decoding (also known as, blind decoding) on a set of PDCCH candidates. A set of PDCCH candidates decoded by the UE is defined as a PDCCH search space set. The search space set may be a common search space or a UE-specific search space. The UE may acquire DCI by monitoring PDCCH candidates in one or more search space sets configured by MIB or higher layer signaling.

2. Uplink Channel Structure

The UE transmits a related signal to the base station through an uplink channel to be described later, and the base station receives the related signal from the UE through an uplink channel to be described later.

(1) Physical Uplink Shared Channel (PUSCH)

PUSCH carries uplink data (e.g., UL-shared channel transport block, UL-SCH TB) and/or uplink control information (UCI), and is transmitted based on the waveform such as CP-OFDM (Cyclic Prefix—Orthogonal Frequency Division Multiplexing) waveform, DFT-s-OFDM (Discrete Fourier Transform-spread-Orthogonal Frequency Division Multiplexing) waveform, etc. When the PUSCH is transmitted based on the DFT-s-OFDM waveform, the UE transmits the PUSCH by applying transform precoding. For example, when transform precoding is not possible (e.g., transform precoding is disabled), the UE transmits a PUSCH based on a CP-OFDM waveform, and when transform precoding is possible (e.g., transform precoding is enabled), the UE may transmit a PUSCH based on a CP-OFDM waveform or a DFT-s-OFDM waveform. PUSCH transmission is dynamically scheduled by a UL grant in DCI, or may be semi-statically scheduled (configured grant) based on higher layer (e.g., RRC) signaling (and/or Layer 1 (L1) signaling (e.g., PDCCH)). PUSCH transmission may be performed on a codebook-based or non-codebook-based basis.

(2) Physical Uplink Control Channel (PUCCH)

The PUCCH carries uplink control information, HARQ-ACK, and/or a scheduling request (SR), and may be divided into a plurality of PUCCHs according to a PUCCH transmission length.

Figure 8:
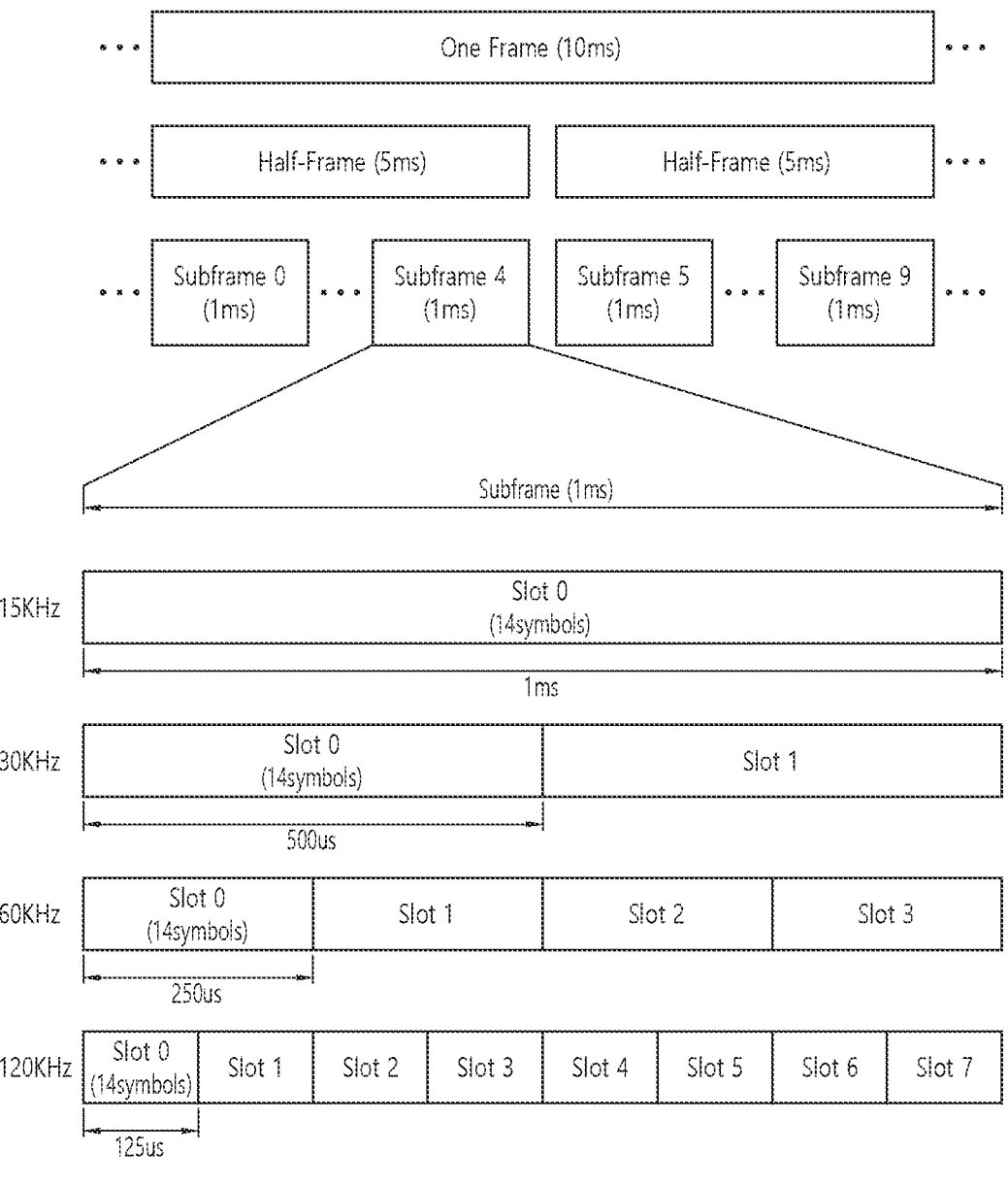
FIG. 8 shows an example of a frame structure in a 3GPP-based wireless communication system.

FIG. 8 shows a frame structure in a 3GPP-based wireless communication system.

The frame structure shown in FIG. 8 is purely exemplary, and the number of subframes, the number of slots, and/or the number of symbols in the frame may be variously changed. In a 3GPP-based wireless communication system, OFDM numerology (e.g., Sub-Carrier Spacing (SCS). Transmission Time Interval (TTI) period) may be set differently between a plurality of cells aggregated for one UE. For example, when the UE is set to different SCS for an aggregated cell, the (absolute time) duration of a time resource (e.g., subframe, slot, or TTI) including the same number of symbols may be different between aggregated cells. Here, the symbol may include an OFDM symbol (or a CP-OFDM symbol) and an SC-FDMA symbol (or a Discrete Fourier Transform-Spread-OFDM (DFT-s-OFDM) symbol).

Referring to FIG. 8, downlink and uplink transmission are configured in frames. Each frame may have a duration of, for example, $T_f=10$ ms. Each frame may consist of two half-frames, and the duration of each half-frame is 5 ms. Each half frame consists of 5 subframes, and the duration $T_{sf}$ per subframe is 1 ms. Each subframe is divided into slots, and the number of slots in the subframe varies according to the subcarrier spacing. Each slot includes 14 or 12 OFDM symbols based on CP (Cyclic Prefix). In the normal CP, each slot includes 14 OFDM symbols, and in the extended CP, each slot includes 12 OFDM symbols. Numerology is based on an exponentially scalable subcarrier spacing $\Delta f=2^u*15$ kHz.

Table 3 shows the number of OFDM symbols per slot $N^{slot}_{symb}$, the number of slots per frame $N^{frame,u}_{slot}$, and the number of slots per subframe $N^{subframe,u}_{slot}$ for a normal CP according to the subcarrier spacing $\Delta f=2^u*15$ KHz.

TABLE 3

| u | $N^{slot}_{symb}$ | $N^{frame,\,u}_{slot}$ | $N^{subframe,\,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 4 shows the number of OFDM symbols per slot $N^{slot}_{symb}$ for the extended CP, the number of slots per frame $N^{frame,u}_{slot}$, and the number of slots per subframe $N^{subframe,u}_{slot}$ according to the subcarrier spacing $\Delta f=2^u*15$ kHz.

TABLE 4

| u | $N^{slot}_{symb}$ | $N^{frame,\,u}_{slot}$ | $N^{subframe,\,u}_{slot}$ |
|---|---|---|---|
| 2 | 12 | 40 | 4 |

A slot includes a plurality of symbols (e.g., 14 or 12 symbols) in the time domain. For each numerology (e.g. subcarrier spacing) and carrier, a resource grid of $N^{size,u}_{grid,x}*N^{RB}_{sc}$ subcarriers and $N^{subframe,u}_{symb}$ OFDM symbols starting from Common Resource Block (CRB) $N^{start,u}_{grid}$ indicated by higher layer signaling (e.g., RRC signaling) is defined. Here, $N^{size,u}_{grid,x}$ is the number of resource blocks (RBs) in the resource grid, and the subscript x is DL for downlink and UL for uplink. $N^{RB}_{sc}$ is the number of subcarriers per RB. In a 3GPP based wireless communication system. $N^{RB}_{sc}$ is generally 12. There is one resource grid for a given antenna port p, subcarrier spacing configuration u, and transmission direction (DL or UL). The carrier bandwidth $N^{size,u}_{grid}$ for the subcarrier spacing configuration u is given by a higher layer parameter (e.g., RRC parameter). Each element of the resource grid for the antenna port p and the subcarrier spacing configuration u is called a resource element (RE), and one complex symbol may be mapped to each RE. Each RE in the resource grid is uniquely identified by an index k in the frequency domain and an index 1 indicating a symbol position with respect to a reference point in the time domain.

Figure 9:
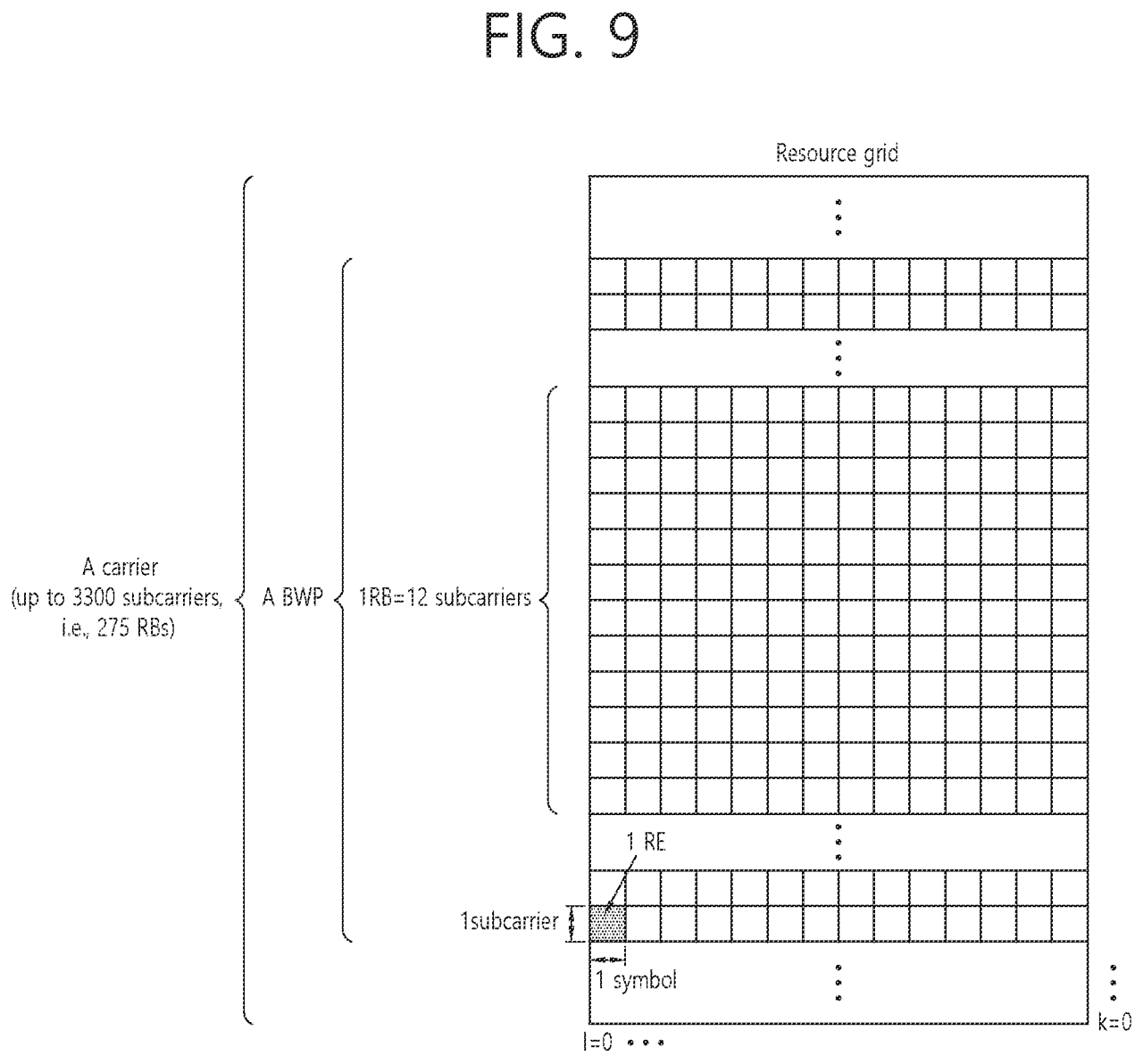

FIG. 9 illustrates the slot structure of a frame.

Referring to FIG. 9, a slot includes a plurality of symbols in the time domain. For example, in the case of a normal CP, one slot may include 14 symbols, but in the case of an extended CP, one slot may include 12 symbols. Alternatively, in the case of a normal CP, one slot may include 7 symbols, but in the case of an extended CP, one slot may include 6 symbols.

A carrier includes a plurality of subcarriers in the frequency domain. A resource block (RB) may be defined as a plurality of (e.g., 12) consecutive subcarriers in the frequency domain. BWP (Bandwidth Part) may be defined as a plurality of consecutive (P)RB ((Physical) Resource Block) in the frequency domain, and may correspond to one numerology (e.g., SCS, CP length, etc.). A carrier may include a maximum of N (e.g., 5) BWPs. Data communication may be performed through the activated BWP. Each element may be referred to as a resource element (RE) in the resource grid, and one complex symbol may be mapped.

In a 3GPP-based wireless communication system, an RB is defined as 12 consecutive subcarriers in a frequency domain. In the 3GPP NR system, the RB is divided into a CRB and a physical resource block (PRB). CRBs are numbered in increasing direction from 0 in the frequency domain for the subcarrier spacing configuration u. The center of subcarrier 0 of CRB 0 for subcarrier spacing configuration u coincides with 'point A', which serves as a common reference point for the resource block grid. In the 3GPP NR system, PRBs are defined within a BandWidth Part (BWP) and are numbered from 0 to $N^{size}_{BWP,i}$-1. Here, i is the BWP number. The relationship between PRB $n_{PRB}$ and CRB $n_{CRB}$ of BWP i is as follows, $n_{PRB}=N_{CRB}+N^{size}_{BWP,i}$, Where $N^{size}_{BWP,i}$ is the CRB whose BWP starts with CRB 0. The BWP includes a plurality of consecutive RBs. A carrier may contain up to N (eg 5) BWPs. The UE may be configured with one or more BWPs on a given CC. Among the BWPs set in the UE, only one BWP may be activated at a time. Active BWP defines the operating bandwidth of the UE within the operating bandwidth of the cell.

In the PHY layer, the uplink transport channels UL-SCH and RACH (Random Access Channel) are mapped to physical channels PUSCH (Physical Uplink Shared Channel) and PRACH (Physical Random Access Channel), respectively, and downlink transport channels DL-SCH, BCH, and PCH are mapped to a Physical Downlink Shared Channel (PDSCH), a Physical Broadcast Channel (PBCH), and a PDSCH, respectively. In the PHY layer. Uplink Control Information (UCI) is mapped to a Physical Uplink Control Channel (PUCCH), Downlink Control Information (DCI) is mapped to a Physical Downlink Control Channel (PDCCH). A MAC PDU related to UL-SCH is transmitted by a UE through a PUSCH based on a UL grant, and a MAC PDU related to DL-SCH is transmitted by a BS through a PDSCH based on DL allocation.

Hereinafter, the following abbreviations may be used.

AMC: Adaptive Modulation and Coding. AR: Augmented Reality, ARQ: Automatic Repeat request, BER: Bit Error Rate, BLER: Block Error Rate, CB: Code Block, CBG: Code Block Group, CC: Chase Combining, CE: Control Element, CQI: Channel Quality Indicator, CR: Coding Rate, CRC: Cyclic Redundancy Check, CSI: Channel State Information, DCI: Downlink Control Information, DL: Down-Link, DL-SCH: Downlink Shared Channel. HARQ: Hybrid Automatic Repeat request, ID: Identifier. IR: Incremental Redundancy, L1: Layer 1, LCG: Logical Channel Group. LTE: Long-Term Evolution, MAC: Medium Access Control, MCS: Modulation and Coding Scheme. MIMO: Multiple Input Multiple Output, NDI: New Data Indicator, NR: New Radio. PDCCH: Physical Downlink Control Channel, PDSCH: Physical Downlink Shared Channel, PDU: Packet Data Unit, PTB: Primary Transport Block. PUCCH: Physical Uplink Control Channel. PUSCH: Physical Uplink Shared Channel, QoS: Quality of Service, RA: Resource Assignment. RLC: Radio Link Control, RV: Redundancy Version. SDU: Service Data Unit, SINR: Signal to Interference and Noise Ratio, SNS: Social Networking Service, STB: Secondary Transport Block, TB: Transport Block, TTI: Transmit Time Interval. UL: UpLink, UL-SCH: Uplink Shared Channel, VR: Virtual Reality.

The present disclosure is related to a wireless transmission device and a method, in a wireless communication system, for efficiently providing i) a plurality of services requiring different QoS or ii) a service consisting of a plurality of data streams requiring different QoS in an intra-UE.

As data traffic of a cellular mobile communication system rapidly increases, a technology for transmitting data through unlicensed spectrum bands has been developed. In unlicensed bands, since the frequency can be shared with devices operating in other communication systems, such as Wi-Fi devices, it is designed to use a channel access method based on an energy detection operation to enable coexistence between a plurality of radio access technologies. For example, LTE-LAA (Licensed Assisted Access) and NR-U support LBT (Listen Before Talk) technology that allows frequency sharing between a plurality of radio access technologies according to a CSMA/CA procedure.

Because it always involves LBT operation in order to transmit data in the unlicensed band, in a general transmission method of scheduling one PUSCH with one downlink control information (DCI), there is a problem in that an uplink data transmission rate is greatly reduced. For example, the UE performed an LBT operation to transmit the PUSCH in the resource scheduled by the first DCI, and as a result, it may be determined that the PUSCH cannot be transmitted in the resource. Then, the UE will have to receive the second DCI again. Since the base station also needs to perform an LBT operation in order to transmit the second DCI, transmission of the second DCI may be delayed according to channel conditions.

Accordingly, a multi-TTI scheduling technology capable of scheduling a plurality of PUSCHs through one DCI is introduced in LTE-eLAA (enhanced LAA) and NR-U.

Figure 10:
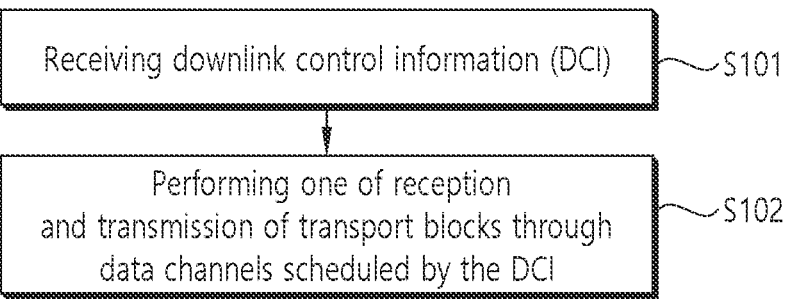
FIG. 10 shows an example of a MAC PDU of 5G NR downlink.

FIG. 10 illustrates an operation of a UE according to multi-TTI scheduling.

Referring to FIG. 10, the UE receives downlink control information (DCI) (S101). For example, the UE may acquire the DCI by performing an attempt to detect PDCCH candidates in the configured search space (also referred to as blind decoding or blind detection). The DCI may be a DCI format for scheduling a PUSCH (e.g., DCI format 0_0, 0_1, etc.), a DCI format for scheduling a PDSCH (e.g., DCI format 1_0, 1_1, etc.), a DCI format for scheduling a PSSCH (e.g., DCI format 3_0, 3_1, etc.).

The UE performs either reception or transmission of transport blocks through data channels (e.g., a plurality of PDSCHs, or a plurality of PUSCHs, or a plurality of PSSCHs) scheduled by the DCI (S102). That is, the data channel may be a shared channel such as PDSCH, PUSCH, and PSSCH.

Figure 11:
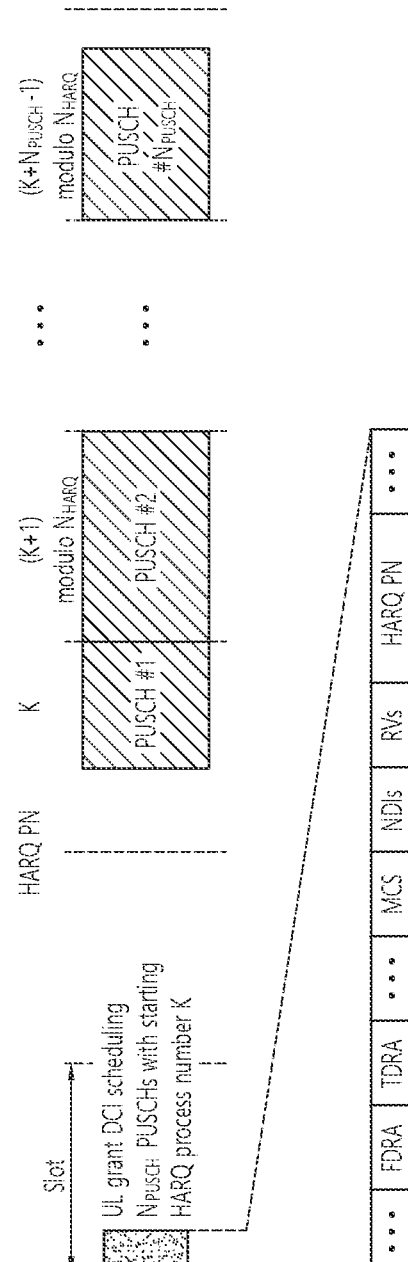
FIG. 11 illustrates multi-TTI scheduling for scheduling a plurality of PUSCHs through one DCI.

FIG. 11 illustrates multi-TTI scheduling for scheduling a plurality of PUSCHs through one DCI.

Referring to FIG. 11, information transmitted through the DCI 800 may include at least one of a Frequency Domain Resource Assignment (FDRA), a Time Domain Resource Assignment (TDRA), a Modulation and Coding Scheme (MCS), a plurality of New Data Indicators (NDIs), and a plurality of RV (Redundancy Version), and HARQ PN (Hybrid Automatic Repeat and reQuest Process Number).

FDRA includes frequency resource information of scheduled PUSCHs. TDRA includes time resource information of scheduled PUSCHs. For example, the TDRA may inform an index of a TDRA table including time domain resource allocation information such as a start symbol and length for each PUSCH together with the number of scheduled PUSCHs. The UE can know the number of PUSCHs scheduled through each DCI and time domain resource information of each PUSCH from this information.

The MCS is equally applied to all PUSCHs and informs a modulation and coding method. NDI and RV are composed of 1 bit for each PUSCH, and as many bits as the maximum number of PUSCHs that can be scheduled according to the TDR A table.

HARQ PN is a HARQ process number of the first PUSCH among a plurality of PUSCHs scheduled through DCI, and the HARQ process number of the second and subsequent PUSCHs has a value sequentially increasing (e.g., increasing by 1) from the HARQ process number of the first PUSCH. FIG. 1$l$ exemplifies a case where $N_{PUSCH}$ PUSCHs are scheduled by one DCI and the HARQ PN of the first PUSCH is K. $N_{HARQ}$ is the number of operating HARQ processes.

Multiple TTI scheduling may be applied to not only PUSCH but also PDSCH scheduling. 3GPP standardized Rel-17 to support the 52.6 GHz to 71 GHz band. As the frequency of the carrier increases, phase noise acts as a major factor that degrades the performance of the communication system. In the OFDM system employed in NR, performance degradation due to phase noise can be alleviated by widening the sub-carrier spacing (SCS). For this reason. NR uses a wider SCS as the frequency of the carrier increases.

However, when the SCS increases in the frequency domain based on the same number of subcarriers, the time domain length of one OFDM symbol and a slot consisting of 14 OFDM symbols is shortened. When the UE attempts to receive PDCCH in every slot, as the slot length is shortened, the number of blind detections and the number of control channel elements (CCEs) that can be processed are reduced, which reduces the scheduling flexibility of the system. Also, as the number of PDCCH reception attempts increases, the power consumption of the UE may increase. As an improvement method for this, a method in which the UE attempts to receive the PDCCH in a period of a plurality of slots instead of every slot has been proposed. In this case, in a method of scheduling only one shared channel through one DCI, a problem of reducing the maximum data transmission rate occurs. In order to overcome this, standardization of a technique for scheduling a plurality of PUSCHs or PDSCHs through one DCI has progressed.

Logical channels may be classified into two groups: a control channel and a traffic channel. The control channel is used only to transmit control plane information, and there are the following channels.

1) BCCH (Broadcast Control Channel): a downlink channel for broadcasting system control information.

2) Paging Control Channel (PCCH): A downlink channel carrying a paging message.

3) CCCH (Common Control Channel): A channel for transmitting control information between a UE and a network, and this channel is used for a UE that does not have an RRC connection with the network.

4) Dedicated Control Channel (DCCH): A point-to-point bi-directional channel that transmits dedicated control information between a UE and a network, and is used by a UE with an RRC connection.

The traffic channel is only used to transmit user plane information. A Dedicated Traffic Channel (DTCH) is a point-to-point channel dedicated to one UE for transmitting user information. DTCH may exist in both uplink and downlink.

With the development of wireless communication technology and user terminals, there is an increasing need to provide various services requiring different QoS to one UE or to provide a service composed of a plurality of data streams requiring various QoS. As a representative example of the latter, XR (extended Reality) requires transmission of a plurality of data streams, such as video data, audio data, and control data, having different requirements such as transmission speed, reliability, and delay time. In particular, in order to provide high-quality XR service, it is important to transmit large amounts of XR video data generated at 60 fps (frames per second) or 120 fps with low latency.

XR video data may be transmitted in a plurality of streams with different QoS. For example, it can be transmitted as I (Intra-coded)-stream and P (Predicted)-stream that require different QoS, or FOV (Field of View) stream and omnidirectional that require different QoS.

Since XR video data shows a pattern in which a large amount of data is periodically transmitted (bursty) in a short period, it is necessary to efficiently transmit a large amount of data in a short time while minimizing the use of PDCCH resources. For this purpose, a multi-TTI scheduling DCI technique for scheduling a plurality of PDSCHs or PUSCHs through one DCI may be used.

However, in the conventional multi-TTI scheduling DCI technology, all PDSCHs or PUSCHs scheduled by one DCI (hereinafter, referred to as a shared channel or PXSCH) are transmitted through the same MCS. That is, even if the transmission qualities (e.g., BLER, delay time, etc.) required for data transmitted through each shared channel are different, they have the same physical transmission quality In a situation where QoS required by I (Intra-coded)-stream and P (Predicted)-stream or FOV (Field of View) stream and omnidirectional stream are different from each other, it is difficult to efficiently use radio resources, and therefore, spectral efficiency may decrease in the prior art. For example, when transmitting I (Intra-coded)-stream and P (Predicted)-stream through a plurality of shared channels scheduled through one DCI, if the target BLERs required to satisfy the QoSs of the two streams are different, MCS should be selected based on a lower target BLER (ie higher QoS). Accordingly, a case of allocating excessive radio resources to a stream requiring a higher target BLER (i.e., lower QoS) may occur.

In order to solve this problem, in the present disclosure, when a plurality of data streams having different target BLERs are transmitted through a plurality of shared channels scheduled through one DCI, an apparatus and method capable of dividing the plurality of data streams into two groups and transmitting each group using a different MCS will be described.

When a plurality of logical channels or data streams (hereinafter referred to as logical channels) having different QoS requirements are to be transmitted using different MCSs through a plurality of shared channels scheduled through one DCI, in order to deliver a plurality of MCS information and shared channel information to which each MCS is applied, there is a problem in that the DCI size (i.e., the number of bits) increases. An apparatus and method for dividing a plurality of logical channels into two groups according to QoS characteristics in order to minimize an increase in the size of DCI, and dividing into a plurality of shared channels scheduled through one DCI and transmitting using different MCSs are described.

In general, the lower the MCS of the shared channel, that is, as a lower-order modulation scheme and a lower code rate are used, the lower the BLER. If the BLER is lowered, the probability of successful data transmission increases with only a small number of transmissions, so the transmission delay is reduced. Therefore, it is appropriate to use a low MCS as the target transmission reliability is high and the target transmission latency is low.

When transmitting multiple logical channels with different QoS through multiple shared channels scheduled through one DCI, a logical channel requiring high transmission reliability and low transmission delay is transmitted first by applying a low MCS, and a logical channel requiring low transmission reliability and high transmission delay is transmitted later by applying a high MCS. Then, the MCS indexes are increasing from a low value to a high value. In this case, the first MCS is transmitted as it is and the second and subsequent MCSs are transmitted as only the difference from the MCS transmitted immediately before, so that the MCS can be transmitted with a smaller number of bits without loss of MCS information.

Figure 12:
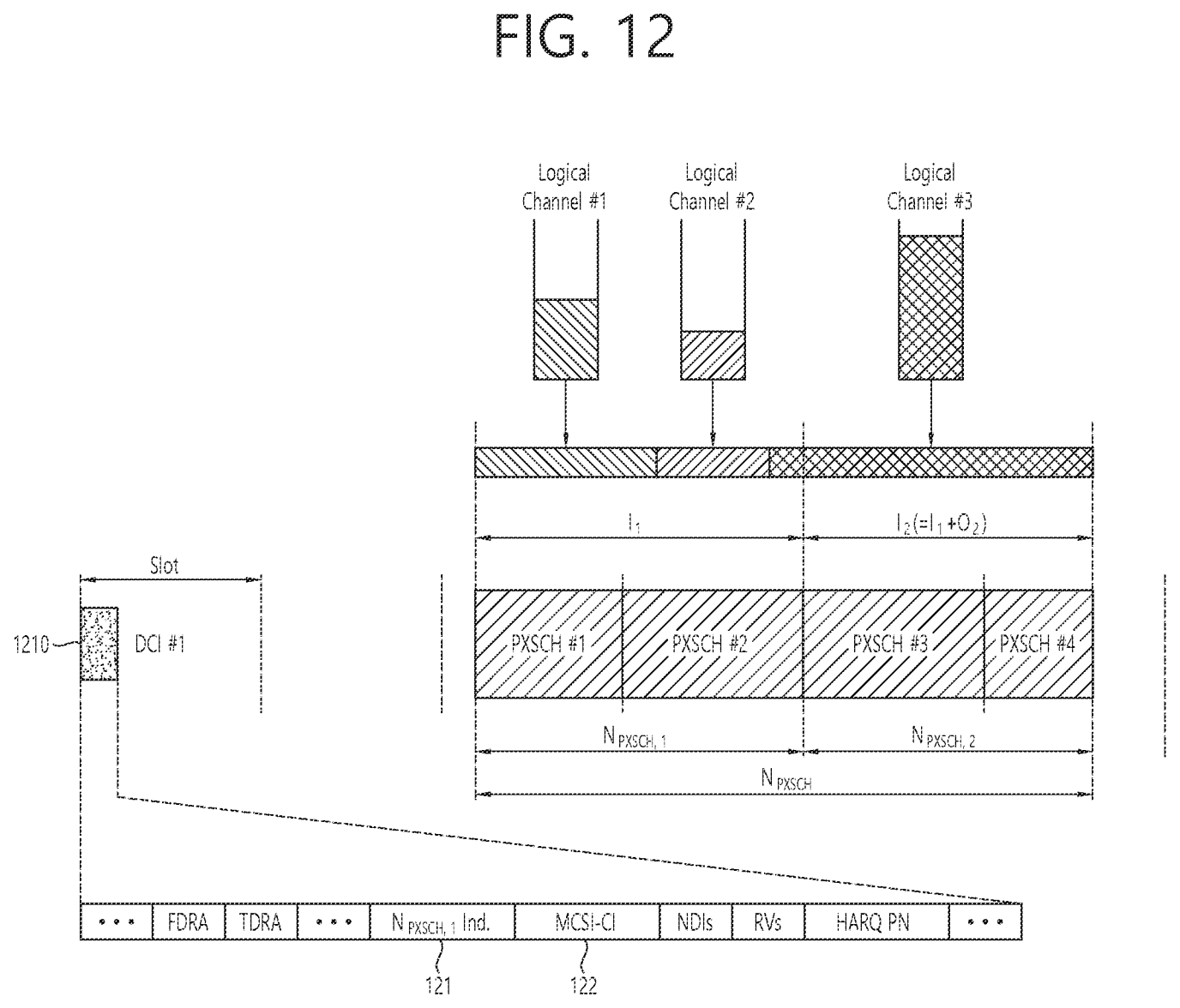

FIG. 12 is an example of dividing a plurality of logical channels into two groups, applying different MCSs to each, and transmitting the plurality of logical channels through a plurality of shared channels scheduled through one DCI.

In FIG. 12, it is assumed that the target BLER of logical channel #1 is the lowest and the target BLER of logical channel #3 is the highest. It is assumed that logical channel #1 and logical channel #2 are scheduled to be transmitted through PXSCH #1 and PXSCH #2 as a group, and logical channel #3 is scheduled to be transmitted through PXSCH #3 and PXSCH #4 as another group.

Referring to FIG. 12, a portion of logical channel #1, logical channel #2, and logical channel #3 is transmitted through PXSCH #1 and PXSCH #2. In this case, the MCS corresponding to the smallest value 11 among the MCS indexes that can satisfy the target BLER of the three logical channels is applied to PXSCH #1 and PXSCH #2. In PXSCH #3 and PXSCH #4, the remaining part of logical channel #3 is transmitted. At this time, the MCS corresponding to the MCS index 12 that can satisfy the target BLER of logical channel #3 is applied to PXSCH #3. Here. $I_2$ is a value greater than or equal to $I_1$. If $I_2$ is greater than $I_1$, $I_2$ may be expressed as the sum of $I_1$ and a positive offset $O_2$ ($I_2=I_1+O_2$).

In order to divide a plurality of shared channels scheduled by one DCI 1210 into two groups (first group, second group) and apply different MCSs to each of them for transmission, shared channels belonging to each group and MCS index information of each group should be delivered.

<Method of Delivering the Number of Shared Channels Belonging to the First Group>

Shared channels scheduled by one DCI 1210 may be arranged and transmitted in an ascending order of an applied MCS index. In this case, the first group and the second group may be distinguished based on information corresponding to the number of shared channels belonging to the first group.

The number of shared channels belonging to the first group may be transmitted through the $N_{PXSCH,1}$ Ind field 121 of the DCI 1210 as shown in FIG. 12. If the maximum number of transmittable shared channels is $N_{PXSCH,max}$, the number of bits required to transmit the number of shared channels belonging to the first group $N_{PXSCH,1}$ is ceil $(\log_2 N_{PXSCH,max})(=\lceil \log_2 N_{PXSCH,max}\rceil)$ For example, if $N_{PXSCH,max}$ is 8, the required number of bits becomes 3, and $(N_{PXSCH,1}-1)$ may be transmitted as a value of the corresponding field ($N_{PXSCH,1}$ Ind. 121) of DCI.

Alternatively, discretely enumerated values may be used to reduce the number of DCI bits. For example, a value 0 indicates the number of shared channels belonging to the first group is 1, a value 1 indicates the number of shared channels belonging to the first group is 3, a value 2 indicates the number of shared channels belonging to the first group is 5, and a value 3 indicates the number of shared channels belonging to the first group is 7, which is defined in the standard or transmitted through an upper layer message such as RRC, and only 2 bits can be used.

<How to Deliver Two MCS Index Information>

If the two MCS indexes (the first MCS index and the second MCS index) are directly transmitted through DCI, twice as many bits as the bits required for one MCS index will be required. For example, in LTE or NR, MCS index values from 0 to 31 are defined. In order to deliver two MCS indexes as they are, 5 bits are required for one MCS index, so a total of 10 bits are required Even when the first MCS index is sent as it is and the second MCS index is informed through a positive difference value from the first MCS index. 10 bits are equally required (That is. 5 bits are needed for the first MCS index, another 5 bits are needed to convey all possible differences between the first MCS index and the second MCS index).

Meanwhile, there are two types of the MCS index: one including both modulation order and code rate information (hereinafter referred to as the first type MCS index) and one including only modulation order information (hereinafter referred to as the second type MCS index).

The table below illustrates a table including the MCS index.

TABLE 5

| MCS index $I_{MCS}$ | Modulation Order $(Q_m)$ | Target code Rate $R \times [1024]$ | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 512 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | | reserved |
| 29 | 4 | | reserved |
| 30 | 6 | | reserved |
| 31 | 8 | | reserved |

For example, when NR supports QPSK, 16QAM, 64QAM, and 256QAM, MCS indexes 0 to 27 include both modulation order and code rate information as illustrated in Table 5 above and can be used for both initial transmission and retransmission. On the other hand, MCS indexes 28 to 31 include only modulation order information and can be used only for retransmission. That is, MCS indexes 0 to 27 are first type MCS indexes, and MCS indexes 28 to 31 are second type MCS indexes.

After dividing a plurality of shared channels scheduled by one DCI 1210 into two groups (first group, second group), i) if the two groups are always restricted to use only the same type of MCS index, and ii) if the MCS information of the first group uses the MCS index (the first MCS index) as it is and the MCS information of the second group uses the difference value from the first MCS index, the number of DCI bits required can be reduced.

For example, when one MCS index is expressed by $N_{MCSI\text{-}bits}$ bits, two MCS indexes may be expressed by $(2 \cdot N_{MCSI\text{-}bits}-1)$ bits. That is, in indicating two MCS indexes, one bit can be reduced compared to the conventional one. For example, if the first type MCS index is from 0 to 27 and the second type MCS index is from 28 to 31 like NR, there are 406 combinations of first-type MCS index and difference value of the two groups, and 10 combinations of second-type MCS index and difference value. Therefore, there are a total of 416 combinations, which can be expressed in 9 bits.

Specifically, if the first type MCS index is from $I_{Type1,min}=0$ to $I_{Type1,max}$, and the second type MCS index is from $I_{Type2,min}=(I_{Type1,max}+1)$ to $I_{Type2,max}$, the number of type 1 MCS indexes $N_{Type1\text{-}MCSI}$, the number of type 2 MCS indexes $N_{Type2\text{-}MCSI}$, the number of combinations of type 1 MCS index and difference value $N_{Type1\text{-}MCSI\text{-}CI}$ and the number of combinations of type 2 MCS index and difference value $N_{Type2\text{-}MCSI\text{-}CI}$ are as follows.

$$N_{Type1\text{-}MCS} = I_{Type1,max} + 1 \qquad \text{[Equation 1]}$$

$$N_{Type2\text{-}MCSI} = I_{Type2,max} - I_{Typ,min} + 1$$

$$N_{Type1\text{-}MCSI} = N_{Type1\text{-}MCSI}(N_{Type1\text{-}MCS} + 1)/2$$

$$N_{Type2\text{-}MCSI\text{-}CI} = N_{Type2\text{-}MCS}(N_{Type2\text{-}MCS} + 1)/2$$

All combinations of first and second type MCS indexes and difference values can correspond 1:1 with integers from 0 to $(N_{Type1\text{-}MCSI\text{-}CI}+N_{Type2\text{-}MCSI\text{-}CI}-1)$. For example, the combinations of the first type MCS index and the difference value may correspond to an integer from 0 to $(N_{Type1\text{-}MCSI\text{-}CI}-1)$, and the combinations of the second type MCS index and the difference value may correspond to integers from $N_{Type1\text{-}MCSI\text{-}CI}$ to $(N_{Type1\text{-}MCSI\text{-}CI}+N_{Type2\text{-}MCSI\text{-}CI}-1)$. This method may be referred to as method 1 hereinafter. That is, the MCSI-CI field 122 of DCI informs a combination of a first type MCS index and a difference value or a combination of a second type MCS index and a difference value.

The encoding for obtaining the integer MCSI-CI (MCS Index Combination Indicator) value C corresponding to the first or second type MCS index $I_1$ and the difference value $O_2$ is as follows.

$$\text{if } I_1 < N_{Type1\text{-}MCSI} \text{ then if } O_2 \leq \frac{N_{Type1\text{-}MCSI}}{2} \text{ then} \qquad \text{[Equation 2]}$$

$$C = I_1 + N_{Type1\text{-}MCSI}O_2 \text{ else}$$

$$C = (N_{Type1\text{-}MCS} - 1 - I_1) + N_{Type1\text{-}MCSI}(N_{Type1\text{-}MCS} - O_2) \text{ else}$$

$$I_1' = I_1 - N_{Type1\text{-}MCSI} \text{ if } O_2 \leq \frac{N_{Type2\text{-}MCSI}}{2} \text{ then}$$

$$C = I_1' + N_{Type2\text{-}MCSI}O_2 + N_{Type1\text{-}MCSI\text{-}C} \text{ else}$$

$$C =$$

$$(N_{Type2\text{-}MCSI} - 1 - I_1') + N_{Type2\text{-}MCSI}(N_{Type2\text{-}MCSI} - O_2) + N_{Type1\text{-}MCSI\text{-}CI}$$

Decoding to obtain the index $I_1$ and the difference value $O_2$ from the MCSI-CI value Cis as follows $$\text{if } C < N_{Type1\text{-}MCSI} \text{ then } O_2' = \left\lfloor \frac{C}{N_{Type1\text{-}MCSI}} \right\rfloor \qquad \text{[Equation 3]}$$

$$I_1' = C - N_{Type1\text{-}MCSI}O_2' \text{ if } (I_1' + O_2') < N_{Type1\text{-}MCSI} \text{ then}$$

$$I_1 = I_1' O_2 = O_2' \text{ else}$$

27

-continued $$I_1 = N_{Type1-MCSI} - 1 - I_1'$$

$$O_2 = N_{Type1-MCSI} - O_2' \text{ else}$$

$$C' = C - N_{Type1-MCSI-CI}$$

$$O_2' = \left\lfloor \frac{C'}{N_{Type2-MCSI}} \right\rfloor$$

$$I_1' = C' - N_{Type2-MCS}O_2' \text{ if}$$

$$(I_1' + O_2') < N_{Type2-MCS} \text{ then}$$

$$I_1 = I_1' + N_{Type1-MCSI}$$

$$O_2 = O_2' \text{ else}$$

$$I_1 = N_{Type2-MCSI} - 1 - I_1' + N_{Type1-MCSI}$$

$$O_2 = N_{Type2-MCSI} - O_2'$$

FIG. 13 illustrates a case in which two MCS indexes are mapped to the MCSI-CI 122 of DCI.

Referring to FIG. 13, the first type MCS index is from 0 to 12 and the second type MCS index is from 13 to 15, and this is an example in which two MCS indexes using 4 bits correspond to the 7-bit MCSI-CI 122 as described in FIG. 12. A combination of two first type MCS indexes corresponds to 0 to 90 of MCSI-CI, and a combination of two second type MCS indexes corresponds to 91 to 96 of MCSI-CI. For example, if the value of MCSI-CI is 14, {the first MCS index ($I_1$), the difference value ($O_2$) between the second MCS index and the first MCS index}={1, 1}, and as a result, it can be seen that $I_1$ is 1 and $I_2$ is 2. If the value of MCSI-CI is 42, {the first MCS index ($I_1$), the difference value ($O_2$) between the second MCS index and the first MCS index}={3, 3}, and as a result, it can be seen that $I_1$ is 3 and $I_2$ is 6. If the value of MCSI-CI is 96, {the first MCS index ($I_1$), the difference value ($O_2$) between the second MCS index and the first MCS index}={13, 2}, and as a result, it can be seen that $I_1$ is 13 and $I_2$ is 15.

On the other hand, by limiting the two groups to always use only the same type of MCS index, and by limiting the difference between the MCS index of the first group and the MCS index of the second group, the number of bits in the MCSI-CI (122) field of DCI can be further reduced. In this case, two MCS indexes expressed by $N_{MCSI-bits}$ bits may correspond to values of MCSI-CI expressed by $N_{MCSI-CI-bits}$ bits which is smaller than ($2 \cdot N_{MCSI-bits}-1$) bits.

In general, since the range of the second type MCS index is small, a restriction may be applied to the first type MCS index. If the number of MCSI-CI values expressed by $N_{MCSI-CI-bits}$ bits is $N_{MCSI-CI}$, the number of $N_{Type1-MCSI-CI-restricted}$ combinations of the limited first type MCS index and difference value can be expressed as follows.

$$N_{MCSI-CI} = 2^{N_{MCSI-CI-bits}} \quad \text{[Equation 4]}$$

$$N_{Type1-MCSI-CI-restrict} = N_{MCSI-CI} - N_{Type2-MCSI-CI}$$

All combinations of first type MCS index and difference value and all combinations of second type MCS index and difference value can correspond 1:1 to integers from 0 to ($N_{MCSI-CI}-1$). For example, the combinations of the first type MCS index and the difference value correspond 1:1 to integers from 0 to ($N_{Type1-MCSI-CI-restricted}-1$), and the combinations of the second type MCS index and the difference value correspond 1:1 to integers from $N_{Type1-MCSI-CI-restricted}$ to ($N_{MCSI-CI}-1$). Hereinafter, this method may be referred to as method 2.

The limit value $O_{2,Type1,max}$ of the difference value $O_2$ between the first type MCS index $I_1$ of the first group and the first type MCS index $I_2$ of the second group can be obtained as follows.

$$\text{find } O_t, \text{ the maximum } O \text{ satisfies } \sum_{i=0}^{O} (N_{Type1-MCSI} - i) \le \quad \text{[Equation 5]}$$

$$N_{Type1-MCSI-CI-restricted}$$

$$I_t = N_{Type1-MCSI-CI-restric} - \sum_{i=0}^{O_t} (N_{Type1-MCSI} - i) \text{ if}$$

$$I_1 < I_t \text{ then } O_{2,Type1,max} = O_t + 1 \text{ else } O_{2,Type1,max} = O_t$$

The encoding for obtaining the integer MCSI-CI value C corresponding to the first or second type MCS index $I_1$ and the difference value $O_2$ ($\le O_{2,Type1,max}$) is as follows.

$$\text{if } I_1 < N_{Type1-MCSI} \text{ then} \quad \text{[Equation 6]}$$

$$C = I_1 + O_2(2N_{Type1-MCSI} - O_2 + 1)/2 \text{ else}$$

$$I_1' = I_1 - N_{Type1-MCS} \text{ if } O_2 \le \frac{N_{Type2-MCS}}{2} \text{ then}$$

$$C = I_1' + N_{Type2-MCS}O_2 + N_{Type1-MCSI-C} \text{ else}$$

$$C = (N_{Type2-MCSI} - 1 - I_1') + N_{Type2-MCS}(N_{Type2-MCSI} - O_2) + N_{Type1-MCSI-C}$$

Decoding to obtain the index h and the difference value $O_2$ from the MCSI-CI value C is as follows.

$$\text{if } C < N_{Type1-MCSI-CI-restricte} \text{ then find } O_2, \quad \text{[Equation 7]}$$

$$\text{the minimum } O \text{ satisfies } C < \sum_{i=0}^{O} (N_{Type1-MCSI} - i) \text{ if}$$

$$O_2 = 0 \text{ then } I_1 = C \text{ else}$$

$$I_1 = C - \sum_{i=0}^{O_2-1} (N_{Type1-MCS} - i) \text{ else}$$

$$C' = C - N_{Type1-MCSI-CI}$$

$$O_2' = \left\lfloor \frac{C'}{N_{Type2-MCSI}} \right\rfloor$$

$$I_1' = C' - N_{Type2-MCSI}O_2' \text{ if}$$

$$(I_1' + O_2') < N_{Type2-MCSI} \text{ then}$$

$$I_1 = I_1' + N_{Type1-MCSI}$$

$$O_2 = O_2' \text{ else}$$

$$I_1 = N_{Type2-MCSI} - 1 - I_1' + N_{Type1-MCS}$$

$$O_2 = N_{Type2-MCSI} - O_2'$$

Figure 14:
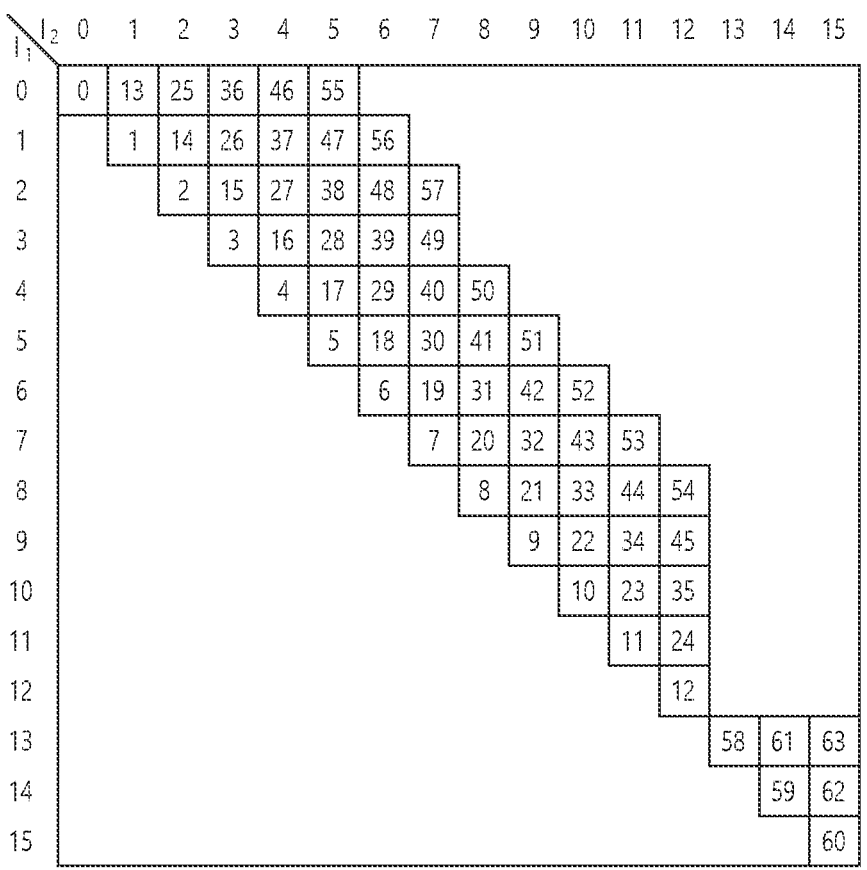
FIG. 14 is another example of a case in which two MCS indexes are mapped to MCSI-CI values of DCI.

FIG. 14 is another example of a case in which two MCS indexes are mapped to MCSI-CI values of DCI.

Referring to FIG. 14, the first type MCS index is from 0 to 12, and the second type MCS index is from 13 to 15, and it is an example in which two MCS indexes using 4 bits correspond to the 6-bit MCSI-CI as described above. A combination of two first type MCS indexes corresponds to MCSI-CI values from 0 to 57, and a combination of two second type MCS indexes corresponds to MCSI-CI values from 58 to 63. The combination of the two first type MCS indexes may be limited to a case in which the difference value $O_2$ is within 5 (when $I_1$ is less than 3) or 4 (when $I_1$ is greater than or equal to 3). (When $I_r$=3, $I_1<I_r$, then $O_{2,Type1,max}$=5, otherwise $O_{2,Type1,max}$=4).

The base station transmits the number of MCSI-CI bits to the UE through a higher layer message such as RRC, and the base station and the UE can determine the MCSI-CI encoding and decoding method according to the number of bits.

Figure 15:
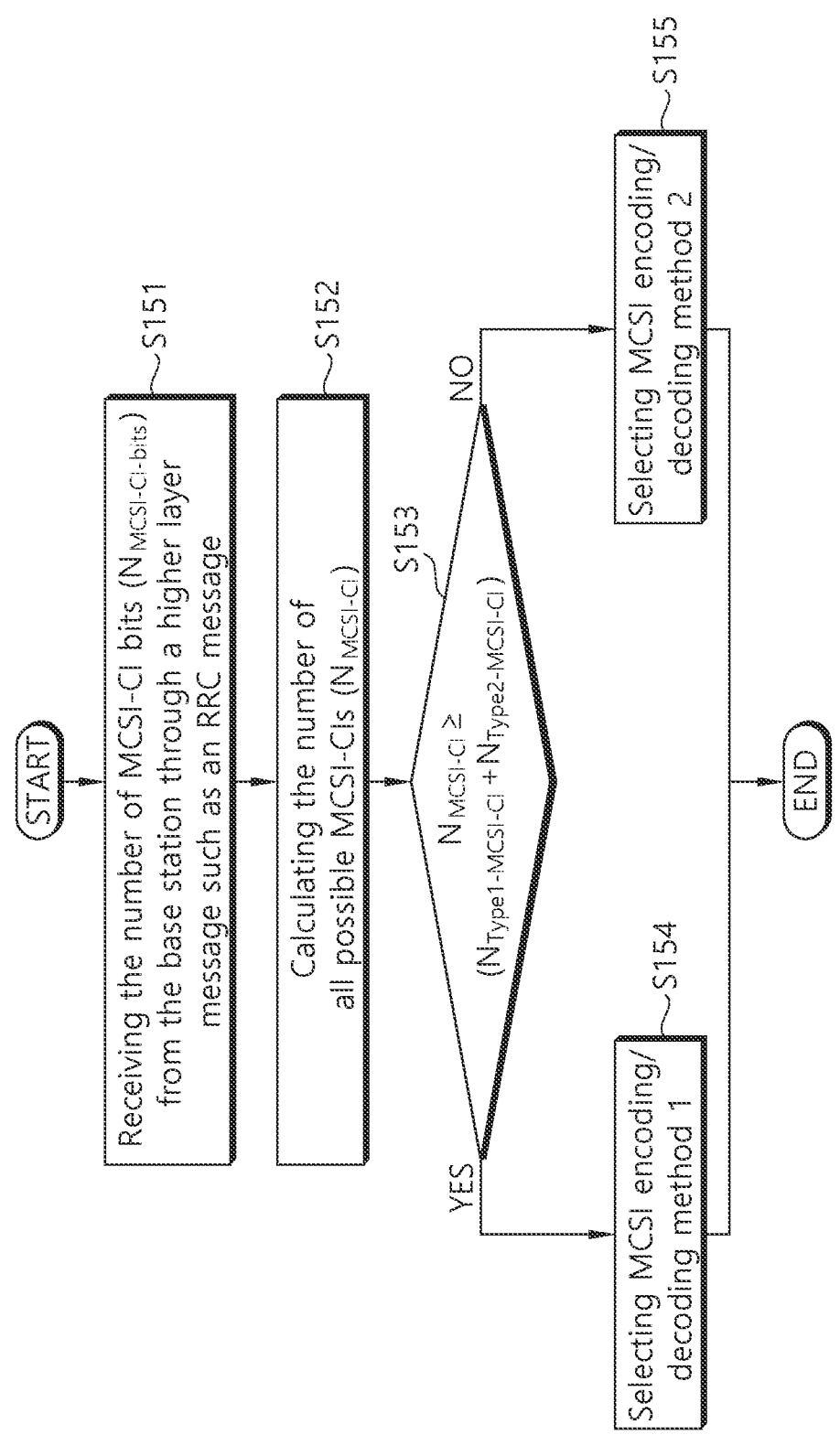
FIG. 15 is an example of a procedure for a UE to determine an MCSI-CI encoding/decoding method according to the number of MCSI-CI bits received from a base station.

FIG. 15 is an example of a procedure for the UE to determine the MCSI-CI encoding/decoding method according to the number of MCSI-CI bits received from the base station.

Referring to FIG. 15, the UE receives the number of MCSI-CI bits ($N_{MCSI-CI-bits}$) from the base station through a higher layer message such as an RRC message (S151).

The UE calculates the number of all possible MCSI-CIs (i.e., $N_{MCSI-CI}$) (S152).

If the number of all possible MCSI-CIs (i.e., $N_{MCSI-CI}$ is greater than or equal to the sum of the number of combinations of the first type MCS index and the difference value ($N_{Type1-MCSI-CI}$) and the number of combinations of the second type MCS index and the difference value ($N_{Type2-MCSI-CI}$) (i.e., $N_{MCSI-CI}\geq(N_{Type1-MCSI-CI}+N_{Type2-MCSI-CI})$), MCSI encoding/decoding method 1 (method 1 described above) is selected (S154), otherwise (i.e., $N_{MCSI-CI}<(N_{Type1-MCSI-CI}+N_{Type2-MCSI-CI})$), MCSI encoding/decoding method 2 (method 2 described above) is selected (S155).

FIG. 16 illustrates a data transmission method of a UE according to an embodiment of the present disclosure.

Referring to FIG. 16, the UE receives an information element defining how and where to search for physical downlink control channel (PDCCH) candidates (S161).

The information element may include, for example, information indicating a control resource set (CORESET) where a search space is available, information related to a DCI format to be searched by the UE, a slot of a PDCCH monitoring occasion, a PDCCH monitoring period and an offset, information related to a monitoring position in the frequency domain, information related to a PDCCH monitoring symbol in a slot, information related to a search space (search space ID, search space type, etc.), information for setting the search space to a UE specific search space (USS), and the like.

The CORESET may be composed of, for example, $N^{CORESET}_{RB}$ resource blocks in the frequency domain and $N^{CORESET}_{symb}\in\{1, 2, 3\}$ symbols in the time domain. $N^{CORESET}_{RB}$ and $N^{CORESET}_{symb}$ may be provided/set by the base station through a higher layer signal.

A plurality of CCEs (or REGs) may be included in the CORESET. The UE may attempt to detect the PDCCH in units of 1, 2, 4, 8 or 16 CCEs within the CORESET. One or a plurality of CCEs capable of attempting PDCCH detection may be referred to as PDCCH candidates.

The UE monitors a set of PDCCH candidates in one or more CORESETs based on the information element (S162). Here, monitoring implies receiving each PDCCH candidate and decoding it according to the monitored downlink control information (DCI) formats.

The UE detects one downlink control information (DCI) format for scheduling the first shared channel and the second shared channel by the monitoring (S163). The first shared channel and the second shared channel may be located in different slots or may be located in the same slot. Each of the first shared channel and the second shared channel may carry at least one transport block (TB).

The UE transmits the first data of the first logical channel group through the first shared channel based on the DCI format (S164), and transmits the second data of the second logical channel group through the second shared channel based on the DCI format (S165).

Here, the first logical channel group and the second logical channel group are classified based on a required quality of service (QoS).

And, the second MCS index applied to the second shared channel is greater than or equal to the first MCS index applied to the first shared channel. The first MCS index and the second MCS index are one of a first type MCS index that informs both a modulation order information and code rate information in an MCS index table (e.g., Table 5) and the second type MCS index that informs a modulation order information, and the first MCS index and the second MCS index are MCS indexes of the same type. That is, both the first MCS index and the second MCS index are limited to either all the first type MCS indexes or all the second type MCS indexes.

The value of the MCS field (the MCSI-CI field described above) included in the DCI format informs a combination of i) the first MCS index, and ii) the difference value between the second MCS index and the first MCS index. Through this, the UE can know both the first MCS index and the second MCS index.

In addition, a difference value between the first MCS index and the second MCS index may be limited to a specific value or less.

The number of bits of the MCS field (MCSI-CI field) is smaller than the sum of the number of bits required to indicate the first MC'S index and the number of bits required to indicate the second MCS index. For example, when the number of bits required to indicate the first MCS index is 4 bits and the number of bits required to indicate the second MCS index is 4 bits, if the aforementioned method 1 is applied, the number of bits of the MCS field (MCSI-CI field) may be 7 bits. Alternatively, when the aforementioned method 2 is applied, the number of bits of the MCS field (the MCSI-CI field) may be 6 bits.

The first MCS index may be an MCS index capable of satisfying the lowest target BLER among target BLERs of each of the logical channels included in the first logical channel group. The second MCS index may be an MCS index capable of satisfying the lowest target BLER among target BLERs of each of the logical channels included in the second logical channel group.

Each of the first shared channel and the second shared channel may be a PUSCH.

In the method described with reference to FIG. 16, when the DCI format is referred to as a first DCI format, the method may further include receiving a second DCI format for scheduling a third shared channel and a fourth shared channel. The third shared channel and the fourth shared channel may be located in different slots or may be located in the same slot.

The UE may receive third data of a third logical channel group through the third shared channel based on the second DCI format, and fourth data of a fourth logical channel group through the fourth shared channel based on the second DCI format. The third logical channel group and the fourth logical channel group are divided based on required QoS. A fourth MCS index applied to the fourth shared channel is greater than or equal to a third MCS index applied to the third shared channel. The third MCS index and the fourth MCS index are one of a third type MCS index indicating both modulation order information and code rate information in the MCS index table and a fourth type MCS index indicating the modulation order information. The third MCS index and the fourth MCS index are MCS indexes of the same type.

The value of the MCS field (MCSI-CI field) included in the second DCI format informs a combination of i) the third MCS index and ii) a difference value between the third MCS index and the fourth MCS index.

In addition, a difference value between the third MCS index and the fourth MCS index may be limited to a specific value or less.

The number of bits of the MCS field included in the second DCI format is smaller than the sum of the number of bits required to indicate the third MCS index and the number of bits required to indicate the fourth MCS index. For example, when the number of bits required to indicate the third MCS index is 4 bits and the number of bits required to indicate the fourth MCS index is 4 bits, if the aforementioned method 1 is applied, the number of bits of the MCS field (MCSI-CI field) may be 7 bits. Alternatively, if the aforementioned method 2 is applied, the number of bits of the MCS field (the MCSI-CI field) may be 6 bits.]

The third MCS index may be an MCS index capable of satisfying the lowest target BLER among target BLERs of each of the logical channels included in the fourth logical channel group, and the fourth MCS index may be an MCS index capable of satisfying the lowest target BLER among target BLERs of each of the logical channels included in the fourth logical channel group.

Each of the third shared channel and the fourth shared channel may be a PDSCH.

In the method described with reference to FIG. 16, the method may further include receiving a DCI format or an SCI format for scheduling the fifth shared channel and the sixth shared channel. The fifth shared channel and the sixth shared channel may be located in different slots or may be located in the same slot.

Based on the DCI format or the SCI format, the UE may transmit or receive the fifth data of a fifth logical channel group through the fifth shared channel, and based on the DCI format or the SCI format, the UE may transmit or receive the sixth data of a sixth logical channel group through the sixth shared channel. The fifth logical channel group and the sixth logical channel group are divided based on required QoS. A sixth MCS index applied to the sixth shared channel is greater than or equal to a fifth MCS index applied to the fifth shared channel. The fifth MCS index and the sixth MCS index are one of a fifth type MCS index indicating both modulation order information and code rate information in the MCS index table and a sixth type MCS index indicating the modulation order information. The fifth MCS index and the sixth MCS index are MCS indexes of the same type. The value of the MCS field included in the DCI format or the SCI format may indicate a combination of i) the fifth MCS index and ii) a difference value between the fifth MCS index and the sixth MCS index.

Each of the fifth shared channel and the sixth shared channel may be a PSSCH.

FIG. 17 illustrates a signaling process between a base station and a UE according to an embodiment of the present disclosure.

Referring to FIG. 17, the base station provides an information element defining how/where to search for PDCCH candidates to the UE (S170). The information element may be included in system information or may be included in a UE-specific higher layer configuration message.

As already described in FIG. 16, the information element may define how/where to search for a PDCCH candidate.

The base station transmits a DCI format for scheduling the first shared channel and the second shared channel to the UE from a set of PDCCH candidates of one or more control resource sets (CORESET) based on the information element (S171). That is, the base station may transmit the DCI format through the PDCCH in the search space configured for the UE.

The UE detects the DCI format by blind decoding the PDCCH candidates in the configured search space (S172). As shown in FIG. 12, the DCI format may inform the number of shared channels belonging to the first group (via the $N_{PXSCH,1}$ Ind field). In addition, MCS information for the first shared channel (the shared channel belonging to the first group) and the second shared channel (the shared channel belonging to the second group) may be provided (via the MCSI-CI field). As described with reference to FIGS. 13 and 14, the bit size of the MCSI-CI field can be reduced compared to the prior art.

The UE transmits the first PUSCH scheduled by the DCI format in the first slot (S173).

The UE transmits the second PUSCH scheduled by the DCI format in the second slot (S174).

That is, in terms of the base station, the base station transmits one downlink control information (DCI) format for scheduling the first shared channel and the second shared channel. The first shared channel and the second shared channel may be located in different slots or may be located in the same slot.

The base station receives first data of a first logical channel group through the first shared channel based on the DCI format, and receives second data of a second logical channel group through the second shared channel based on the DCI format.

In this case, the first logical channel group and the second logical channel group are divided based on required QoS, and the second MCS index applied to the second shared channel is greater than or equal to the first MCS index applied to the first shared channel.

The first MCS index and the second MCS index are one of a first type MCS index indicating both modulation order information and code rate information and a second type MCS index indicating the modulation order information in the MCS index table. The first MCS index and the second MCS index are MCS indexes of the same type.

And, the value of the MCS field included in the DCI format informs a combination of i) the first MCS index and ii) a difference value between the second MCS index and the first MCS index.

The shared channel may be any one of PUSCH, PDSCH, and PSSCH, and each shared channel may carry at least one transport block. DCI for scheduling the shared channel may vary depending on what the corresponding shared channel is. The DCI includes MCS index information for scheduling shared channels. As described above. MCS indexes for shared channels are limited to any one type of MCS index among the first type MCS index and the second type MCS index. Additionally, the difference value may be limited to a predetermined value or less. The value of the MCS field included in the DCI may inform the combination of i) the first MCS index and ii) the difference between the second MCS index and the first MCS index, thereby indicating the values of the two MCS indexes.

According to the method and apparatus according to the present disclosure, when transmitting a plurality of data streams with different QoS through a plurality of shared channels (PDSCH, PUSCH. PSSCH, etc.) scheduled by one DCI, while minimizing the increase in DCI size, it can be divided into two groups according to QoS requirements such as target BLER and transmitted using different MCSs. Accordingly, it is possible to increase the frequency transmission efficiency while satisfying the QoS for each data stream.

Advantageous effects which can be obtained through specific embodiments of the present specification are not limited to the advantageous effects listed above. For example, there may be a variety of technical effects that a person having ordinary skill in the related art can understand and/or derive from the present specification. Accordingly, the specific effects of the present specification are not limited to those explicitly described herein, but may include various effects that may be understood or derived from the technical features of the present specification.

The technical features of the present specification may be implemented directly in hardware, in software executed by a processor, or a combination of the two. For example, in wireless communication, a method performed by a wireless device may be implemented in hardware, software, firmware, or a combination thereof. For example, the software may reside in RAM, flash memory, ROM. EPROM, EEPROM, registers, hard disk, a removable disk, a CD-ROM, or other storage medium.

Some examples of a storage medium may be coupled to the processor such that the processor can read information from the storage medium. Alternatively, the storage medium may be integrated into the processor. The processor and the storage medium may be in the ASIC. In another example, the processor and the storage medium may exist as separate components.

Computer-readable media may include tangible, non-transitory computer-readable storage media.

For example, non-transitory computer-readable media may include RAM such as synchronous dynamic RAM (SDRAM), ROM, non-volatile RAM (NVRAM), EEPROM, flash memory, magnetic or optical data storage media or may include other media that can be used to store the instructions or data structures. The non-transitory computer-readable medium may include a combination of the above.

In addition, the methods described herein may be realized, at least in part, by computer readable communication media that carry or communicate code in the form of instructions or data structures and which a computer can access, read and/or execute.

According to some implementations herein, a non-transitory computer-readable medium (CRM) stores a plurality of instructions.

More specifically, CRM stores instructions that cause actions to be performed by one or more processors. The operation includes an operation of receiving one downlink control information (DCI) format for scheduling the first shared channel and the second shared channel, and an operation of transmitting the first data of the first logical channel group through the first shared channel based on the DCI format and an operation of transmitting the second data of a second logical channel group through the second shared channel based on the DCI format.

As described above, the first logical channel group and the second logical channel group are divided based on required QoS, the second MCS index applied to the second shared channel is greater than or equal to the first MCS index applied to the first shared channel. The first MCS index and the second MCS index are one of a first type MCS index indicating both modulation order information and code rate information in an MCS index table, and a second type MCS index indicating the modulation order information. The first MCS index and the second MCS index are MCS indexes of the same type. The value of the MCS field included in the DCI may inform the combination of i) the first MCS index and ii) the difference between the second MCS index and the first MCS index.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:

receiving, by a user equipment (UE), information element defining how and where to search for physical downlink control channel (PDCCH) candidates;

monitoring, by the UE, a set of PDCCH candidates in one or more control resource sets (CORESETs) based on the information element, wherein the monitoring implies receiving each PDCCH candidate and decoding according to monitored downlink control information (DCI) formats;

detecting, by the UE, a DCI format scheduling both a first shared channel and a second shared channel by the monitoring;

transmitting, by the UE, first data of a first logical channel group through the first shared channel based on the DCI format; and transmitting, by the UE, second data of a second logical channel group through the second shared channel based on the DCI format, wherein the first logical channel group and the second logical channel group are divided based on a required quality of service (QoS), wherein a second modulation and coding scheme (MCS) index applied to the second shared channel is greater than or equal to a first MCS index applied to the first shared channel, wherein the first MCS index and the second MCS index are restricted to have the same type, which is one of a first type and a second type, wherein an MCS index of the first type indicates both modulation order information and code rate information in an MCS index table, wherein an MCS index of the second type indicates only modulation order information in the MCS index table, and wherein a value of an MCS field included in the DCI format specifies a combination of the first MCS index and a difference value between the second MCS index and the first MCS index.

2. The method of claim 1, wherein the difference value between the first MCS index and the second MCS index is limited to a specific value or less.

3. The method of claim 1, wherein a number of bits of the MCS field is smaller than a sum of a number of bits required to indicate the first MCS index and a number of bits required to indicate the second MCS index.

4. The method of claim 1, wherein the first MCS index is an MCS index capable of satisfying a lowest target block error rate (BLER) among target BLERs of each of logical channels included in the first logical channel group.

5. The method of claim 1, wherein the second MCS index is an MCS index capable of satisfying a lowest target BLER among target BLERs of each of logical channels included in the second logical channel group.

6. The method of claim 1, wherein each of the first shared channel and the second shared channel is a physical uplink shared channel (PUSCH).

7. The method of claim 1, wherein when the DCI format is a first DCI format, further receiving a second DCI format scheduling a third shared channel and a fourth shared channel.

8. The method of claim 1, wherein the first shared channel and the second shared channel are located in different slots.

9. The method of claim 1, wherein the first shared channel and the second shared channel are located in a same slot.

10. The method of claim 7, further comprising:
receiving third data of a third logical channel group through the third shared channel based on the second DCI format; and
receiving fourth data of a fourth logical channel group through the fourth shared channel based on the second DCI format;
wherein the third logical channel group and the fourth logical channel group are divided based on a required QoS,
wherein a fourth MCS index applied to the fourth shared channel is greater than or equal to a third MCS index applied to the third shared channel,
wherein the third MCS index and the fourth MCS index are one of i) a third type MCS index indicating both modulation order information and code rate information in the MCS index table and ii) a fourth type MCS index indicating the modulation order information, and are MCS indexes of a same type, and
wherein a value of a MCS field included in the second DCI format informs a combination of i) the third MCS index and ii) a difference value between the third MCS index and the fourth MCS index.

11. The method of claim 7, further comprising:
receiving an SCI format scheduling a fifth shared channel and a sixth shared channel.

12. The method of claim 10, wherein a difference value between the third MCS index and the fourth MCS index is limited to a specific value or less.

13. The method of claim 10, wherein a number of bits of the MCS field included in the second DCI format is smaller than a sum of a number of bits required to indicate the third MCS index and a number of bits required to indicate the fourth MCS index.

14. The method of claim 10, wherein the third MCS index is an MCS index capable of satisfying a lowest target BLER among target BLERs of each of logical channels included in the fourth logical channel group.

15. The method of claim 10, wherein the fourth MCS index is an MCS index capable of satisfying a lowest target BLER among target BLERs of each of logical channels included in the fourth logical channel group.

16. The method of claim 10, wherein each of the third shared channel and the fourth shared channel is a physical downlink shared channel (PDSCH).

17. The method of claim 11, further comprising:
receiving fifth data of a fifth logical channel group through the fifth shared channel based on the SCI format; and
receiving sixth data of a sixth logical channel group through the sixth shared channel based on the SCI format;
wherein the fifth logical channel group and the sixth logical channel group are divided based on a required QoS,
wherein a sixth MCS index applied to the sixth shared channel is greater than or equal to a fifth MCS index applied to the fifth shared channel,
wherein the fifth MCS index and the sixth MCS index are one of i) a fifth type MCS index indicating both modulation order information and code rate information in the MCS index table and ii) a sixth type MCS index indicating the modulation order information, and are MCS indexes of a same type, and
wherein a value of a MCS field included in the SCI format informs a combination of i) the fifth MCS index and ii) a difference value between the fifth MCS index and the sixth MCS index.

18. The method of claim 11, wherein each of the fifth shared channel and the sixth shared channel is a physical sidelink shared channel (PSSCH).

19. A user equipment (UE) comprising:
at least one transceiver;
at least one processor connected to the at least one transceiver; and
at least one memory operably coupled to the at least one processor,
wherein the at least one memory stores instructions that, based on being executed by the at least one processor, cause the at least one processor to perform operations comprising:
receiving information element defining how and where to search for physical downlink control channel (PDCCH) candidates;
monitoring a set of PDCCH candidates in one or more control resource sets (CORESETs) based on the information element, wherein the monitoring implies receiving each PDCCH candidate and decoding according to monitored downlink control information (DCI) formats;
detecting a DCI format scheduling both a first shared channel and a second shared channel by the monitoring;
transmitting first data of a first logical channel group through the first shared channel based on the DCI format; and
transmitting second data of a second logical channel group through the second shared channel based on the DCI format,
wherein the first logical channel group and the second logical channel group are divided based on a required quality of service (QoS),
wherein a second modulation and coding scheme (MCS) index applied to the second shared channel is greater than or equal to a first MCS index applied to the first shared channel,
wherein the first MCS index and the second MCS index are restricted to have the same type, which is one of a first type and a second type, wherein an MCS index of the first type indicates both modulation order information and code rate information in an MCS index table, wherein an MCS index of the second type indicates only modulation order information in the MCS index table, and wherein a value of an MCS field included in the DCI format specifies a combination of the first MCS index and a difference value between the second MCS index and the first MCS index.

20. A method comprising:

transmitting, by a base station, information element defining how and where to search for physical downlink control channel (PDCCH) candidates;

transmitting, by the base station, a DCI format scheduling both a first shared channel and a second shared channel in a set of PDCCH candidates in one or more control resource sets (CORESETs) based on the information element;

receiving, by the base station, first data of a first logical channel group through the first shared channel based on the DCI format; and receiving, by the base station, second data of a second logical channel group through the second shared channel based on the DCI format, wherein the first logical channel group and the second logical channel group are divided based on a required quality of service (QoS), wherein a second modulation and coding scheme (MCS) index applied to the second shared channel is greater than or equal to a first MCS index applied to the first shared channel, wherein the first MCS index and the second MCS index are restricted to have the same type, which is one of a first type and a second type, wherein an MCS index of the first type indicates both modulation order information and code rate information in an MCS index table, wherein an MCS index of the second type indicates only modulation order information in the MCS index table, and wherein a value of an MCS field included in the DCI format specifies a combination of the first MCS index and a difference value between the second MCS index and the first MCS index.

* * * * *